(12) United States Patent
Elshafie et al.

(10) Patent No.: US 11,811,537 B2
(45) Date of Patent: Nov. 7, 2023

(54) PER-LINK REDUNDANCY VERSION ASSIGNMENT FOR UPLINK RELAYS

(71) Applicant: QUALCOMM Incorporated, San Diego, CA (US)

(72) Inventors: Ahmed Elshafie, San Diego, CA (US); Yi Huang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/406,898

(22) Filed: Aug. 19, 2021

(65) Prior Publication Data

US 2022/0131657 A1 Apr. 28, 2022

Related U.S. Application Data

(60) Provisional application No. 63/104,235, filed on Oct. 22, 2020.

(51) Int. Cl.
*H04L 1/18* (2023.01)
*H04L 1/1867* (2023.01)
*H04B 7/155* (2006.01)
*H04L 1/00* (2006.01)
*H04L 1/1812* (2023.01)

(52) U.S. Cl.
CPC ....... *H04L 1/1867* (2013.01); *H04B 7/15507* (2013.01); *H04L 1/0076* (2013.01); *H04L 1/189* (2013.01); *H04L 1/1819* (2013.01); *H04L 2001/0097* (2013.01)

(58) Field of Classification Search
None
See application file for complete search history.

(56) References Cited

U.S. PATENT DOCUMENTS

2017/0288817 A1\* 10/2017 Cao ................ H04L 1/0079
2020/0228194 A1\* 7/2020 Hassan Hussein .................... H04B 7/18513
2022/0022233 A1\* 1/2022 Lee ................ H04L 1/0031

\* cited by examiner

*Primary Examiner* — Kouroush Mohebbi
(74) *Attorney, Agent, or Firm* — Holland & Hart LLP

(57) ABSTRACT

Methods, systems, and devices for wireless communications are described for a relay UE and a source UE to provide transmissions of uplink communications in a decode and forward procedure in which redundancy version (RV) identifications of each instance of a transmission or retransmission are associated with a particular link of the source UE or relay UE. A set of RV sequences may be configured, with the source UE using a first subset of the RV sequences, and the relay UE using a second subset of RV sequences that is non-overlapping with the first subset. A base station or destination UE that receives the transmissions from the source UE and relay UE may thus receive RVs in accordance with the set of RV sequences.

30 Claims, 24 Drawing Sheets

PER-LINK REDUNDANCY VERSION ASSIGNMENT FOR UPLINK RELAYS

CROSS REFERENCE

The present application for patent claims the benefit of U.S. Provisional Patent Application No. 63/104,235 by Elshafie et al., entitled "PER-LINK REDUNDANCY VERSION ASSIGNMENT FOR UPLINK RELAYS," filed Oct. 22, 2020, assigned to the assignee hereof, and expressly incorporated by reference herein.

FIELD OF TECHNOLOGY

The following relates to wireless communications, including per-link redundancy version assignment for uplink relays.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support techniques for user equipment (UE) based relaying for coverage enhancement. In various aspects, described techniques provide for a relay UE and a source UE to provide transmissions of uplink communications in which redundancy version (RV) identifications of each instance of a transmission or retransmission are associated with a particular link of the source UE or relay UE. In some cases, a set of RV sequences may be configured, with the source UE using a first subset of the set of RV sequences, and the relay UE using a second subset of the set of RV sequences that is non-overlapping with the first subset. Such techniques may provide that a base station that receives the transmissions from the source UE and relay UE receives RVs in accordance with the set of RV sequences. In some cases, the source UE may use self-decodable RVs in the first subset of RV sequences which may allow the relay UE to decode any RV used by the source UE. The relay UE, after successful decoding of the communication from the source UE, may then retransmit the communication to the base station (or another relay UE) using a RV of the second subset of RVs such that the combined source UE and relay UE RV sequence corresponds to the set of RV sequences.

A method of wireless communication at a relay UE is described. The method may include receiving, from a base station, configuration information that indicates the relay UE is to relay uplink communications from at least a first UE to the base station, and that indicates a first subset of a sequence of redundancy version IDs associated with communications of the first UE and a second subset of the sequence of redundancy version IDs that are to be used for relayed uplink communications, where the first subset and the second subset are non-overlapping, receiving, from the first UE, a first uplink communication having a first redundancy version ID from the first subset of the sequence of redundancy version IDs, and transmitting, to the base station, the first uplink communication with a second redundancy version ID from the second subset of the sequence of redundancy version IDs.

An apparatus for wireless communication at a relay UE is described. The apparatus may include a processor, memory coupled with the processor, and instructions stored in the memory. The instructions may be executable by the processor to cause the apparatus to receive, from a base station, configuration information that indicates the relay UE is to relay uplink communications from at least a first UE to the base station, and that indicates a first subset of a sequence of redundancy version IDs associated with communications of the first UE and a second subset of the sequence of redundancy version IDs that are to be used for relayed uplink communications, where the first subset and the second subset are non-overlapping, receive, from the first UE, a first uplink communication having a first redundancy version ID from the first subset of the sequence of redundancy version IDs, and transmit, to the base station, the first uplink communication with a second redundancy version ID from the second subset of the sequence of redundancy version IDs.

Another apparatus for wireless communication at a relay UE is described. The apparatus may include means for receiving, from a base station, configuration information that indicates the relay UE is to relay uplink communications from at least a first UE to the base station, and that indicates a first subset of a sequence of redundancy version IDs associated with communications of the first UE and a second subset of the sequence of redundancy version IDs that are to be used for relayed uplink communications, where the first subset and the second subset are non-overlapping, receiving, from the first UE, a first uplink communication having a first redundancy version ID from the first subset of the sequence of redundancy version IDs, and transmitting, to the base station, the first uplink communication with a second redundancy version ID from the second subset of the sequence of redundancy version IDs.

A non-transitory computer-readable medium storing code for wireless communication at a relay UE is described. The code may include instructions executable by a processor to receive, from a base station, configuration information that indicates the relay UE is to relay uplink communications from at least a first UE to the base station, and that indicates a first subset of a sequence of redundancy version IDs associated with communications of the first UE and a second subset of the sequence of redundancy version IDs that are to be used for relayed uplink communications, where the first subset and the second subset are non-overlapping, receive, from the first UE, a first uplink communication having a first redundancy version ID from the first subset of the sequence of redundancy version IDs, and transmit, to the base station, the first uplink communication with a second redundancy version ID from the second subset of the sequence of redundancy version IDs.

Some examples of the method, apparatuses, and non-transitory computer-readable medium described herein may further include operations, features, means, or instructions for transmitting, to the first UE, a feedback indication that acknowledges successful receipt of the first uplink communication, and where the transmitting the first uplink communication with the second redundancy version ID may be performed responsive to the transmitting the feedback indication. In some examples of the method, apparatuses, and non-transitory computer-readable medium described herein, the first subset of the sequence of redundancy version IDs are self-decodable at a receiving device. In some examples of the method, apparatuses, and non-transitory computer-readable medium described herein, the configuration information may be received from the base station in RRC signaling, in a medium access control (MAC) control element (CE), or any combinations thereof.

Some examples of the method, apparatuses, and non-transitory computer-readable medium described herein may further include operations, features, means, or instructions for receiving a retransmission of the first uplink communication from the first UE, and where the retransmission uses a third redundancy version ID from the first subset of the sequence of redundancy version IDs responsive to a negative-acknowledgment from the second UE, and where the retransmission uses the third redundancy version ID from either of the first subset or the second subset of the sequence of redundancy version IDs responsive to an acknowledgment from the second UE. Some examples of the method, apparatuses, and non-transitory computer-readable medium described herein may further include operations, features, means, or instructions for receiving, from the base station, a negative-acknowledgment associated with the first uplink communication, and retransmitting the first uplink communication to the base station using a third redundancy version ID from the second subset of the sequence of redundancy version IDs.

Some examples of the method, apparatuses, and non-transitory computer-readable medium described herein may further include operations, features, means, or instructions for attempting to decode an initial instance of the first uplink communication from the first UE, transmitting a negative-acknowledgment feedback indication to the first UE responsive to an unsuccessful attempt to decode the initial instance of the first uplink communication, and receiving a subsequent instance of the first uplink communication with an incremented redundancy version ID from the first subset of the sequence of redundancy version IDs. Some examples of the method, apparatuses, and non-transitory computer-readable medium described herein may further include operations, features, means, or instructions for transmitting an acknowledgment feedback indication to the first UE responsive to successfully decoding the first uplink communication, and discontinuing transmitting feedback to the first UE responsive to the acknowledgment feedback indication.

In some examples of the method, apparatuses, and non-transitory computer-readable medium described herein, the configuration information includes a first number of instances that the first uplink communication is to be retransmitted prior to a feedback indication from the base station, and includes a second number of instances that the first uplink communication is to be retransmitted subsequent to a negative-acknowledgment feedback indication from the base station. In some examples of the method, apparatuses, and non-transitory computer-readable medium described herein, the first number of instances and the second number of instances may be a same or different number of instances, and where the first UE, the second UE, or both may be configured to use any redundancy version ID of the sequence of redundancy version IDs subsequent to the negative-acknowledgment feedback indication from the base station.

A method of wireless communication at a first UE is described. The method may include receiving, from a base station, configuration information that indicates a second UE is to relay uplink communications from the first UE to the base station, and that indicates a first subset of a sequence of redundancy version IDs associated with communications of the first UE and a second subset of the sequence of redundancy version IDs that are to be used for relayed uplink communications of the second UE, where the first subset and the second subset are non-overlapping, transmitting a first uplink communication having a first redundancy version ID from the first subset of the sequence of redundancy version IDs, and retransmitting the first uplink communication having a second redundancy version ID from the first subset of the sequence of redundancy version IDs.

An apparatus for wireless communication at a first UE is described. The apparatus may include a processor, memory coupled with the processor, and instructions stored in the memory. The instructions may be executable by the processor to cause the apparatus to receive, from a base station, configuration information that indicates a second UE is to relay uplink communications from the first UE to the base station, and that indicates a first subset of a sequence of redundancy version IDs associated with communications of the first UE and a second subset of the sequence of redundancy version IDs that are to be used for relayed uplink communications of the second UE, where the first subset and the second subset are non-overlapping, transmit a first uplink communication having a first redundancy version ID from the first subset of the sequence of redundancy version IDs, and retransmit the first uplink communication having a second redundancy version ID from the first subset of the sequence of redundancy version IDs.

Another apparatus for wireless communication at a first UE is described. The apparatus may include means for receiving, from a base station, configuration information that indicates a second UE is to relay uplink communications from the first UE to the base station, and that indicates a first subset of a sequence of redundancy version IDs associated with communications of the first UE and a second subset of the sequence of redundancy version IDs that are to be used for relayed uplink communications of the second UE, where the first subset and the second subset are non-overlapping, transmitting a first uplink communication having a first redundancy version ID from the first subset of the sequence of redundancy version IDs, and retransmitting the first uplink communication having a second redundancy version ID from the first subset of the sequence of redundancy version IDs.

A non-transitory computer-readable medium storing code for wireless communication at a first UE is described. The code may include instructions executable by a processor to receive, from a base station, configuration information that indicates a second UE is to relay uplink communications from the first UE to the base station, and that indicates a first subset of a sequence of redundancy version IDs associated with communications of the first UE and a second subset of the sequence of redundancy version IDs that are to be used for relayed uplink communications of the second UE, where the first subset and the second subset are non-overlapping, transmit a first uplink communication having a first redundancy version ID from the first subset of the sequence of redundancy version IDs, and retransmit the first uplink communication having a second redundancy version ID from the first subset of the sequence of redundancy version IDs.

In some examples of the method, apparatuses, and non-transitory computer-readable medium described herein, the first subset of the sequence of redundancy version IDs may be self-decodable at a receiving device. In some examples of the method, apparatuses, and non-transitory computer-readable medium described herein, the configuration information may be received from the base station in RRC signaling, in a MAC-CE, or any combinations thereof.

In some examples of the method, apparatuses, and non-transitory computer-readable medium described herein, the second redundancy version ID may be used for the retransmitting responsive to a negative-acknowledgment associated with the first uplink communication from the second UE, and where one or more retransmissions of the first uplink communication uses a third redundancy version ID from either of the first subset or the second subset of the sequence of redundancy version IDs responsive to an acknowledgment associated with the first uplink communication from the second UE.

Some examples of the method, apparatuses, and non-transitory computer-readable medium described herein may further include operations, features, means, or instructions for receiving, responsive to the transmitting the first uplink communication, a negative-acknowledgment from the second UE, and where the retransmitting may be performed responsive to the negative-acknowledgment and uses an incremented redundancy version ID from the first subset of the sequence of redundancy version IDs. In some examples of the method, apparatuses, and non-transitory computer-readable medium described herein, the second UE discontinues transmitting feedback information for retransmitted instances of the first uplink communication responsive to a feedback indication that indicates successful decoding of the first uplink communication.

In some examples of the method, apparatuses, and non-transitory computer-readable medium described herein, the configuration information includes a first number of instances that the first uplink communication is to be retransmitted prior to a feedback indication from the base station, and includes a second number of instances that the first uplink communication is to be retransmitted subsequent to a negative-acknowledgment feedback indication from the base station. In some examples of the method, apparatuses, and non-transitory computer-readable medium described herein, the first number of instances and the second number of instances may be a same or different number of instances, and where the first UE, the second UE, or both may be configured to use any redundancy version ID of the sequence of redundancy version IDs subsequent to the negative-acknowledgment feedback indication from the base station.

A method of wireless communication at a base station is described. The method may include transmitting, to a source UE and a relay UE, configuration information that indicates the relay UE is to relay uplink communications from the source UE to the base station, and that indicates a first subset of a sequence of redundancy version IDs associated with communications of the source UE and a second subset of the sequence of redundancy version IDs that are to be used for relayed uplink communications of the relay UE, where the first subset and the second subset are non-overlapping, receiving, from the source UE, a first uplink communication having a first redundancy version ID from the first subset of the sequence of redundancy version IDs, and receiving, from the relay UE, a retransmission of the first uplink communication having a second redundancy version ID from the first subset of the sequence of redundancy version IDs.

An apparatus for wireless communication at a base station is described. The apparatus may include a processor, memory coupled with the processor, and instructions stored in the memory. The instructions may be executable by the processor to cause the apparatus to transmit, to a source UE and a relay UE, configuration information that indicates the relay UE is to relay uplink communications from the source UE to the base station, and that indicates a first subset of a sequence of redundancy version IDs associated with communications of the source UE and a second subset of the sequence of redundancy version IDs that are to be used for relayed uplink communications of the relay UE, where the first subset and the second subset are non-overlapping, receive, from the source UE, a first uplink communication having a first redundancy version ID from the first subset of the sequence of redundancy version IDs, and receive, from the relay UE, a retransmission of the first uplink communication having a second redundancy version ID from the first subset of the sequence of redundancy version IDs.

Another apparatus for wireless communication at a base station is described. The apparatus may include means for transmitting, to a source UE and a relay UE, configuration information that indicates the relay UE is to relay uplink communications from the source UE to the base station, and that indicates a first subset of a sequence of redundancy version IDs associated with communications of the source UE and a second subset of the sequence of redundancy version IDs that are to be used for relayed uplink communications of the relay UE, where the first subset and the second subset are non-overlapping, receiving, from the source UE, a first uplink communication having a first redundancy version ID from the first subset of the sequence of redundancy version IDs, and receiving, from the relay UE, a retransmission of the first uplink communication having a second redundancy version ID from the first subset of the sequence of redundancy version IDs.

A non-transitory computer-readable medium storing code for wireless communication at a base station is described. The code may include instructions executable by a processor to transmit, to a source UE and a relay UE, configuration information that indicates the relay UE is to relay uplink communications from the source UE to the base station, and that indicates a first subset of a sequence of redundancy version IDs associated with communications of the source UE and a second subset of the sequence of redundancy version IDs that are to be used for relayed uplink communications of the relay UE, where the first subset and the second subset are non-overlapping, receive, from the source UE, a first uplink communication having a first redundancy version ID from the first subset of the sequence of redundancy version IDs, and receive, from the relay UE, a retransmission of the first uplink communication having a second redundancy version ID from the first subset of the sequence of redundancy version IDs.

In some examples of the method, apparatuses, and non-transitory computer-readable medium described herein, the first subset of the sequence of redundancy version IDs may be self-decodable at a receiving device. In some examples of the method, apparatuses, and non-transitory computer-readable medium described herein, the configuration information may be transmitted in RRC signaling, in a MAC-CE, or any combinations thereof.

Some examples of the method, apparatuses, and non-transitory computer-readable medium described herein may further include operations, features, means, or instructions for receiving a retransmission of the first uplink communication from the source UE, and where the retransmission uses a third redundancy version ID from the first subset of the sequence of redundancy version IDs responsive to a negative-acknowledgment from the relay UE, and where the retransmission uses the third redundancy version ID from either of the first subset or the second subset of the sequence of redundancy version IDs responsive to an acknowledgment from the relay UE. Some examples of the method, apparatuses, and non-transitory computer-readable medium described herein may further include operations, features, means, or instructions for receiving one or more retransmissions of the first uplink communication from the relay UE with an incremented redundancy version ID from the second subset of the sequence of redundancy version IDs.

In some examples of the method, apparatuses, and non-transitory computer-readable medium described herein, the configuration information includes a first number of instances that the first uplink communication is to be retransmitted prior to a feedback indication from the base station, and includes a second number of instances that the first uplink communication is to be retransmitted subsequent to a negative-acknowledgment feedback indication from the base station. In some examples of the method, apparatuses, and non-transitory computer-readable medium described herein, the first number of instances and the second number of instances may be a same or different number of instances, and where the source UE, the relay UE, or both may be configured to use any redundancy version ID of the sequence of redundancy version IDs subsequent to the negative-acknowledgment feedback indication from the base station.

DETAILED DESCRIPTION

Figure 1:
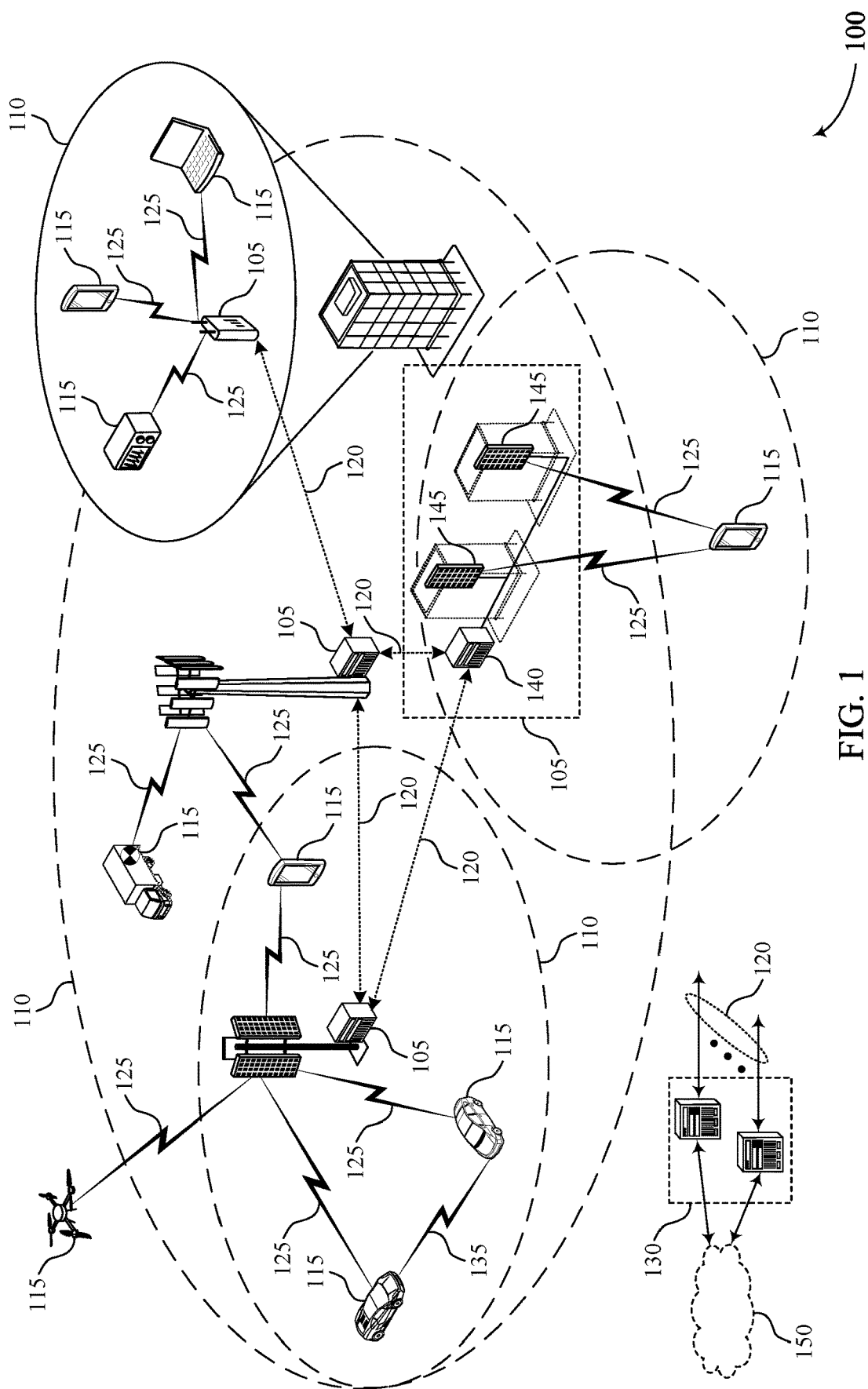
FIG. 1 illustrates an example of a system for wireless communications that supports per-link redundancy version assignment for uplink relays in accordance with aspects of the present disclosure.

In some wireless communications systems, a base station may configure multiple user equipments (UEs) to support decode and forward relaying, which may provide for greater uplink coverage for some UEs. For example, a decode and forward relaying procedure may enable a UE (e.g., a relay UE, which may be referred to as a second UE herein) to listen for an uplink data communication from an originating UE (e.g., a source UE, which may be referred to as a first UE herein) to a base station and, in cases in which the relay UE successfully receives (e.g., "overhears") and decodes the data communication from the source UE, to forward the data communication received from the source UE to the base station. This may effectively result in a repeat transmission of the data communication to the base station, which may increase the likelihood that the base station is able to successfully receive and decode the data. For example, a communication link between the relay UE and the base station may be associated with an improved channel quality than a communication link between the source UE and the base station, such that the base station may have a greater likelihood of successfully receiving a communication from the relay UE than from the source UE.

To configure multiple UEs to support decode and forward relaying, the base station may transmit configuration information to the source UE(s) and relay UE(s). For example, the base station may transmit downlink control information (DCI), such as a group or common DCI, to the multiple UEs to indicate resources that the multiple UEs may use for a decode and forward relaying procedure. For example, the configuration information may indicate an uplink resource over which a source UE may transmit data and over which the base station and a relay UE (or multiple relay UEs) may monitor for the data transmission from the source UE. In some aspects, the relay UE may successfully receive and decode the data transmission from the source UE while the base station may unsuccessfully receive and decode the data transmission from the source UE. The configuration information may also indicate an uplink resource over which the relay UE may forward the data transmission received from the source UE to the base station and, in aspects in which the relay UE successfully receives and decodes the data transmission from the source UE while the base station fails to successfully receive and decode the data transmission, the relay UE may attempt to forward the data transmission received from the source UE to the base station over the indicated uplink resource.

In some implementations of the present disclosure, the source UE and the relay UE may be configured with a redundancy version (RV) identification that is associated with each uplink communication. For example, a RV sequence of {0,2,3,1} may be used for multiple instances of an uplink communication, in which an initial communication uses RV0, a second instance uses RV2, a third instance uses RV3, and so on. A device that receives the multiple instances may perform soft combining on the received instances of the communications, and the RV identifications of each instance may have a different parity check such that using different RVs may help in doing better data combing at the base station (or other receiving device). In various aspects discussed herein, source UEs and relay UEs may be configured with multiple RV sequences such that a receiving device that receives different instances of a communication from a source or one or more relay UEs may perform combining and decoding based on a nominal RV sequence. For example, UEs may be configured with three RV sequences, including a typical/nominal RV type (e.g., an RV sequence of {0,2,3,1}) that may be used in a first round of relaying process activated by a group/common DCI, a first subset of RVs (e.g., an RV sequence type-1 for a source UE), and a second subset of RVs (e.g., an RV sequence type-2 for a relay UE), where the subsets of RVs may be used after the relay UE announces its ability to correctly decode the packet (e.g., in a next relaying round if the base station is unable to decode an first round of communications). The RV sequences may be configured for relay UEs and source UEs, for example, using radio resource control (RRC) signaling, using a medium access control (MAC) control element (CE), using other downlink signaling (e.g., physical downlink control channel (PDCCH) or physical downlink shared channel (PDSCH) signaling), or any combinations thereof.

For instance, a typical/nominal RV sequence (e.g., which may be referred to herein as a set of RV IDs) may be RRC or MAC-CE configured and have a RV sequence {0,2,3,1}. A source UE and a relay UE may be configured with different subsets of the set of RV IDs. For example, source UE may use a first subset of RV IDs having a RV sequence of {0,3,0,3}. In some cases, RV0 and RV3 may be self-decodable RV sequence IDs, and thus each instance of a communication of the source UE is self-decodable, compared to instances with RV1 and RV1 which in such cases may be combined with an instance of RV0 or RV3 in order to be decoded. Because the communications of the source UE are self-decodable, the relay UE can check a cyclic redundancy check (CRC) and confirm successful receipt and decoding of the communication. The relay UE in this example may use a second subset of RV IDs having a RV sequence of {2,1,2,1}. Such a configuration may result in the received signal RV at the base station from both source and relay UE transmissions being equivalent to the transmission sequence of RVs TX sequence from a single originating (e.g., source) node. In some cases, self-decodable RV sequences may be used at both the source and relay transmitters, such that the base station may combine or try to decode every message separately. In some cases, before the relay UE is able to decode a communication, the source UE may use a self-decodable RVs (e.g., RV0 and RV3). After the relay UE is able to decode, then any RV could be used by the source UE, and in some cases the source UE may then use the nominal RV sequence defined in RRC (or as in a transmission from a node without relaying, such as RV sequence {0,2,3,1}). Then, given that the relay UE has the packet already, the source UE can use RV3, and the relay UE can use the RV1, and so on.

Particular implementations of the subject matter described in this disclosure can be implemented to realize one or more of the following potential advantages. In some implementations, the described techniques can provide for greater uplink coverage for UEs within a decode and forward relaying procedure by providing different RVs per links over which the source UE and the relay UE may transmit a data communication. Such greater uplink coverage may result in a greater likelihood that the base station will be able to successfully receive the original data communication from the source UE. Further, the different RVs per link may allow the base station to combine the multiple instances of an uplink communication in a same manner as a single transmitter that transmits multiple instances of a communication according to a RV sequence, which may support greater uplink coverage while also increasing the achievable system throughput. As such, the described techniques may provide for greater and more seamless uplink coverage, higher throughput, greater system capacity, and lower latency, among other benefits.

Aspects of the disclosure are initially described in the context of wireless communications systems. Aspects of the disclosure are additionally described in the context of communications timelines and a process flow. Aspects of the disclosure are further illustrated by and described with reference to apparatus diagrams, system diagrams, and flowcharts that relate to per-link redundancy version assignment for uplink relays.

FIG. 1 illustrates an example of a wireless communications system 100 that supports per-link redundancy version assignment for uplink relays in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, sometimes in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a CRC), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In the wireless communications system 100, a base station 105 may transmit DCI (including one or more group/common DCI messages) to multiple UEs 115 to configure a decode and forward relaying procedure with uplink tunneling between the multiple UEs 115 to provide greater uplink coverage for the multiple UEs 115. To configure the multiple UEs 115 to support the decode and forward relaying procedure, the base station 105 may transmit configuration information to the multiple UEs 115 to indicate resources that the multiple UEs 115 may use for the decode and forward relaying procedure, and to indicate RV sequences that are to be used at different UEs 115. For example, a source UE 115 and a relay UE 115 may be configured with different subsets of RV IDs that are associated with each uplink communication. For example, the multiple UEs 115 may be configured with a nominal or base RV sequence of $\{0,2,3,1\}$, a first subset of RVs (e.g., an RV sequence type-1 for a source UE 115), and a second subset of RVs (e.g., an RV sequence type-2 for a relay UE). In some cases, the subsets of RVs may be used by the source and relay UEs 115 to provide multiple instances of a communication that may be combined and decoded at a receiving base station 105 in accordance with techniques for a single source transmitter that transmits multiple instances of a communication according to the base RV sequence.

In some examples, UEs 115 may communicate with base station 105 via uplink and downlink channels (e.g., UEs 115 may transmit data in accordance with the subject matter disclosed herein on a physical uplink shared channel (PUSCH), and the UEs 115 may receive feedback in accordance with the subject matter disclosed herein from the base station 105 on a PDCCH). In other examples where a first UE of the UEs 115 may be communicating with another wireless device (e.g., another UE of the UEs 115), the first UE may communicate via one or more sidelink channels (e.g., by sending data in accordance with the subject matter disclosed herein on a physical sidelink shared channel (PSSCH), or may receive feedback on a physical sidelink feedback channel (PSFCH) in accordance with the subject matter disclosed herein, or both). In some examples, UEs 115 may communicate with both a base station via uplink and downlink channels, as well as with another wireless device (e.g., another UE) via sidelink communications. In such examples, the UEs 115 may transmit data to both a base station and a second UE (e.g., the UEs 115 may transmit data in accordance with the subject matter disclosed herein to base station 105 on a (PUSCH) and may transmit data in accordance with the subject matter disclosed herein to the second UE on a PSSCH), and the UEs 115 may receive feedback from the base station 105 and another wireless device (e.g., the UEs 115 may receive feedback in accordance with the subject matter disclosed herein from base station 105 on a PDCCH, and the UEs 115 may receive feedback in accordance with the subject matter disclosed herein from a second UE on a PSFCH). Other combinations of signaling between a UE, a base station, and other wireless devices may also be performed over various channels and in various configurations in accordance with the subject matter described herein.

Figure 2:
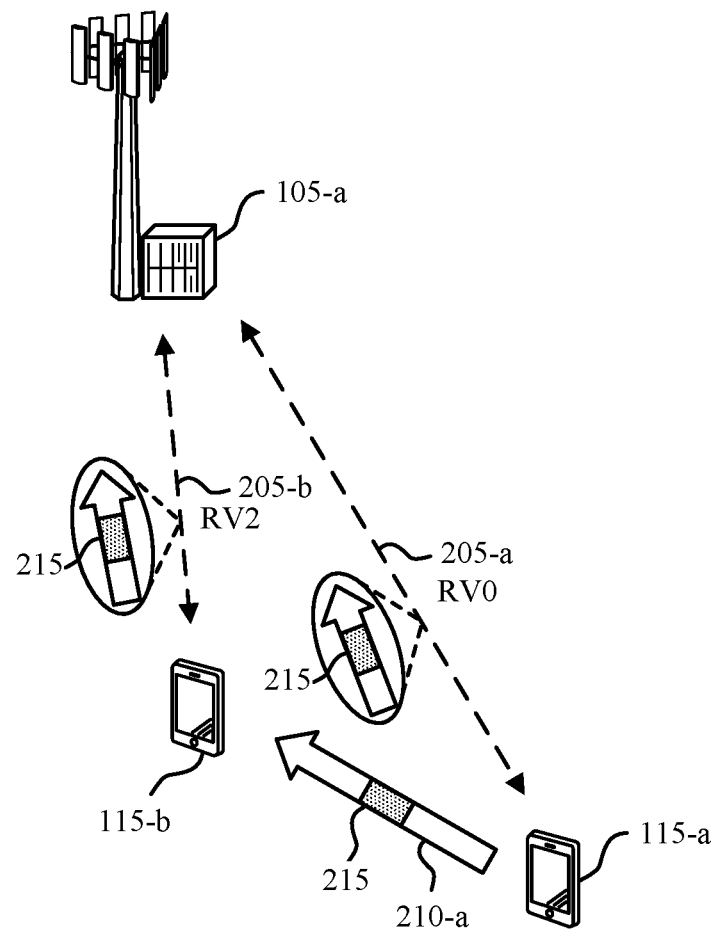
FIG. 2 illustrates an example of a wireless communications system that supports per-link redundancy version assignment for uplink relays in accordance with aspects of the present disclosure.

FIG. 2 illustrates an example of a wireless communications system 200 that supports per-link redundancy version assignment for uplink relays in accordance with aspects of the present disclosure. In some examples, wireless communications system 200 may implement aspects of wireless communications system 100. The wireless communications system 200 may include a base station 105-*a* that may communicate with multiple UEs 115 within a geographic coverage region associated with the base station 105-*a*. The base station 105-*a* may transmit one or more DCI messages to the multiple UEs 115 to support a decode and forward relaying procedure between the multiple UEs 115 and, in some examples, one or more of the UEs 115 may determine a RV sequence for retransmitting data that was previously unsuccessfully forwarded to the base station 105-*a* or for transmitting fresh data to the base station 105-*a*, or both.

In some cases, the base station 105-*a* may broadcast or groupcast DCI to establish one or more uplink tunnels (e.g., a multi-hop tunnel) from a source UE 115, such as a UE 115-*a*, to the base station 105-*a* via one or more relay UEs, such as a UE 115-*b* (and optionally one or more other UEs). Such uplink tunneling from the UE 115-*a* to the base station 105-*a* via the UE 115-*b* may include the allocation of dedicated time and frequency resources over which the UE 115-*a* may send a data transmission 215 to the base station 105-*a* and the allocation of dedicated time and frequency resources over which the UE 115-*b* may forward the data transmission 215 to the base station 105-*a*. For instance, the base station 105-*a* may transmit DCI to the UE 115-*a* and the UE 115-*b*, and the DCI may indicate a first uplink resource over which the UE 115-*a* may transmit a data transmission 215 to the base station 105-*a* over a communication link 205-*a*. In some examples, the base station 105-*a* and the UE 115-*b* may listen or monitor over the first uplink resource for the data transmission 215. As shown in the wireless communications system 200, the UE 115-*b* may listen or monitor for transmissions (e.g., uplink transmissions) from the UE 115-*a* over a communication link 210-*a*. As such, the UE 115-*b* may monitor for the data transmission 215 from the UE 115-*a* to the base station 105-*a* and, if the UE 115-*b* receives (e.g., "overhears") the data transmission 215 from the UE 115-*a*, the UE 115-*b* may attempt to decode the data transmission 215 as part of the decode and forward relaying procedure.

In some examples, UEs 115 may communicate with each other using sidelink communications and sidelink resources, and may communicate with the base station 105-*a* using access link resources allocated for communications with the base station 105-*a*. In such cases, a source UE 115-*a* may communicate to relay UE 115-*b*, which may be a destination UE, over sidelink communication (e.g., the source UE 115-*a* may transmit data on a physical sidelink shared channel (PSSCH) and control signaling over PSSCH or a physical sidelink control channel (PSCCH)). The destination UE 115-*b* may send/forward the data to base station 105-*a* using PUSCH. The destination UE 115-*b* (or source UE 115-*a*) may control the relaying process through sidelink and sidelink control information (SCI) signals (e.g., which include information about relaying, resource allocation, relay selection and other control information). In addition, the base station 105-*a* may control the process and resources (e.g., in sidelink resource allocation mode 1) by communicating to other nodes through the destination UE 115-*a*.

Additionally or alternatively, the decode and forward relaying procedure may be used for UEs 115 communicating with base station 105-*a* on access links, where the relaying procedure may provide uplink coverage enhancement. In such cases, the source UE 115-*a* and relay UE 115-*b* (and any other relay UEs) may communicate directly with the base station 105-*a* through PUSCH channels. The base station 105-*a* may control the relaying process, resource allocation, and relay selection through the DCI (e.g., common DCI).

The DCI for access link coverage enhancement may indicate a downlink resource (e.g., physical HARQ indicator channel (PHICH) or PDCCH resource) over which the base station 105-*a* may transmit feedback to the UE 115-*a* associated with the data transmission 215 from the UE 115-*a* and a resource (e.g., a downlink PDCCH or PDSCH resource) over which the UE 115-*b* may transmit feedback to the UE 115-*a* associated with the data transmission 215 from the UE 115-*a*. As such, the base station 105-*a* may transmit feedback, such as acknowledgment (ACK), which may also be referred to as a positive ACK, or a negative acknowledgment (NACK), to the UE 115-*a* over the indicated downlink resource based on whether the base station 105-*a* successfully or unsuccessfully receives and decodes the data transmission 215 from the UE 115-*a*. Similarly, the UE 115-*b* may transmit an ACK or a NACK, or an indication of whether the UE 115-*b* participates in the decode and forward relaying procedure (which may be based on a capability of the UE 115-*b*), to the UE 115-*a* over the indicated resource configured by the base station 105-*a* based on whether the UE 115-*b* successfully or unsuccessfully receives and decodes the data transmission 215 from the UE 115-*a*.

In some cases, the base station 105-*a* may unsuccessfully receive and decode the data transmission 215 from the UE 115-*a* over the communication link 205-*a* and the UE 115-*b* may successfully receive and decode the data transmission 215 from the UE 115-*a* over the communication link 210-*a*. In such cases, the base station 105-*a* may transmit a NACK to the UE 115-*a* over the downlink resource indicated by the DCI and the UE 115-*b* may transmit an ACK to the UE 115-*a* over the resource indicated by the DCI. Accordingly, the UE 115-*a* may determine that the data transmission 215 was successfully received by the UE 115-*b* and unsuccessfully received by the base station 105-*a*.

The DCI may also indicate an uplink resource over which the UE 115-*b* may forward the data transmission 215 to the base station 105-*a* over the communication link 205-*b* and a downlink resource over which the base station 105-*a* may provide feedback to the UE 115-*b* based on whether or not the base station 105-*a* successfully receives and decodes the data transmission 215 forwarded by the UE 115-*b*. In some cases, the base station 105-*a* may fail to successfully receive and decode the data transmission 215 forwarded by the UE 115-*b* (e.g., in addition to failing to successfully receive and decode the data transmission 215 from the UE 115-*a*) and, in such cases, the base station 105-*a* may transmit a NACK to the UE 115-*b* over the downlink resource assigned for feedback to the data transmission 215 forwarded by the UE 115-*b*. Further, although described in the context of two UEs 115 (e.g., the UE 115-*a* and the UE 115-*b*), such DCI may also indicate a grant for any number of UEs 115 for transmitting or forwarding the data transmission 215 to the base station 105-*a*.

For example, the base station 105-*a* may have a greater likelihood of successfully receiving and decoding the data transmission 215 based on receiving multiple instances of the data transmission 215 from multiple UEs 115. Further, the communication links 205 between the base station 105-*a* and the multiple UEs 115 may be associated with different link or channel qualities, and the likelihood that at least one of the communication links 205 is sufficiently high (e.g., sufficiently high to enable successful reception by the base station 105-*a*) increases in kind with an increase in the quantity of the multiple transmission instances of the data transmission 215. For example, the UE 115-*b* may be able to receive (e.g., "overhear") the data transmission 215 from the UE 115-*a* because the UE 115-*b* is approximately between the UE 115-*a* and the base station 105-*a* (e.g., the UE 115-*b* may be closer to the base station 105-*a* than the UE 115-*a*) and, as such, the communication link 205-*b* may be associated with a greater channel quality than the communication link 205-*c*. Accordingly, in some examples, the base station 105-*a* may have a greater likelihood of receiving the data transmission 215 forwarded by the UE 115-*b* than the data transmission 215 from the UE 115-*a*.

In some cases, however, the base station 105-*a* may unsuccessfully receive and decode (e.g., based on attempting to receive the data, decode the data or both) the data transmission 215 from any of the UE 115-*a* and the UE 115-*b*. Accordingly, the base station 105-*a* may transmit a NACK to each of the transmitting or forwarding (e.g., relaying) UEs 115. In such cases, the UEs 115 may attempt one or more retransmissions to the base station 105-*a*.

Various combinations of communications schemes (e.g., UE 115-*a* or UE 115-*b* communicating with base station 105-*a*, or sidelink communications between UE 115-*a* and UE 115-*b*) may be employed. In some examples, a UE may communicate with a base station via uplink and downlink channels (e.g., UE 115-*a* or UE 115-*b* may transmit data on a PUSCH, and the UE 115-*a* or UE 115-*b* may receive feedback on a PDCCH). In other examples where a UE may be communicating with another wireless device (e.g., another UE), the UE may communicate via one or more sidelink channels (e.g., UE 115-*a* may communicate with UE 115-*b* by sending data on a PSSCH and may receive feedback on a PSFCH). In some examples, a UE may communicate with a base station via uplink and downlink channels, as well as with another wireless device (e.g., a second UE) via sidelink communications. In such examples, a UE may transmit data to both a base station and a second UE (e.g., UE 115-*a* may transmit data to base station 105-*a* on a PUSCH and may transmit data to UE 115-*b* on a PSSCH), and the UE may receive feedback from the base station and another wireless device (e.g., the UE may receive feedback from a base station on a PDCCH, and the UE may receive feedback from a second UE on a PSFCH). Other combinations of signaling between a UE, a base station, and other wireless devices may also be performed over various channels and in various configurations in accordance with the subject matter described herein.

In some implementations of the present disclosure, the UE 115-*a*, which may be referred to as a source UE 115-*a* or first UE 115-*a*, and the UE 115-*b*, which may be a relay UE 115-*b* or a second UE 115-*b*, may be configured with a RV identification that is associated with each communication link 205. For example, a base RV sequence of {0,2,3,1} may be used for multiple instances of an uplink communication, in which an initial communication uses RV0, a second instance uses RV2, a third instance uses RV3, and so on. A device that receives the multiple instances may perform soft combining on the received instances of the communications, and the RV identifications of each instance may have a different parity check such that using different RVs may help in doing better data combing at the base station 105-*a* (or other receiving device). In various aspects discussed herein, source UE 115-*a* and relay UE 115-*b* may be configured with multiple RV sequences such that a receiving device that receives different instances of a communication from a source or one or more relays may perform combining and decoding based on the base or nominal RV sequence.

In some cases, the UEs 115 may be configured with three RV sequences, including a typical/nominal RV type (e.g., an RV sequence of {0,2,3,1}) that may be used in a first round of relaying process activated by a group/common DCI, a first subset of RVs (e.g., an RV sequence type-1 for source UE 115-*a*), and a second subset of RVs (e.g., an RV sequence type-2 for relay UE 115-*b*), where the subsets of RVs may be used after the relay UE 115-*b* announces its ability to correctly decode a communication (e.g., in a next relaying round if the base station 105-*a* (or destination UE in cases of sidelink communications) is unable to decode a first round of communications). The RV sequences may be configured for relay UE 115-*b* and source UE 115-*a*, for example, using RRC signaling, using a MAC-CE, using other downlink signaling (e.g., PDCCH or PDSCH signaling), or any combinations thereof. Examples of different subsets of RV IDs for source UE 115-*a* and relay UE 115-*b*, and multiple instances of an uplink communication transmission using the configured RV IDs are discussed with reference to FIGS. 3 through 6, and in the process flow of FIG. 7.

Figure 3:
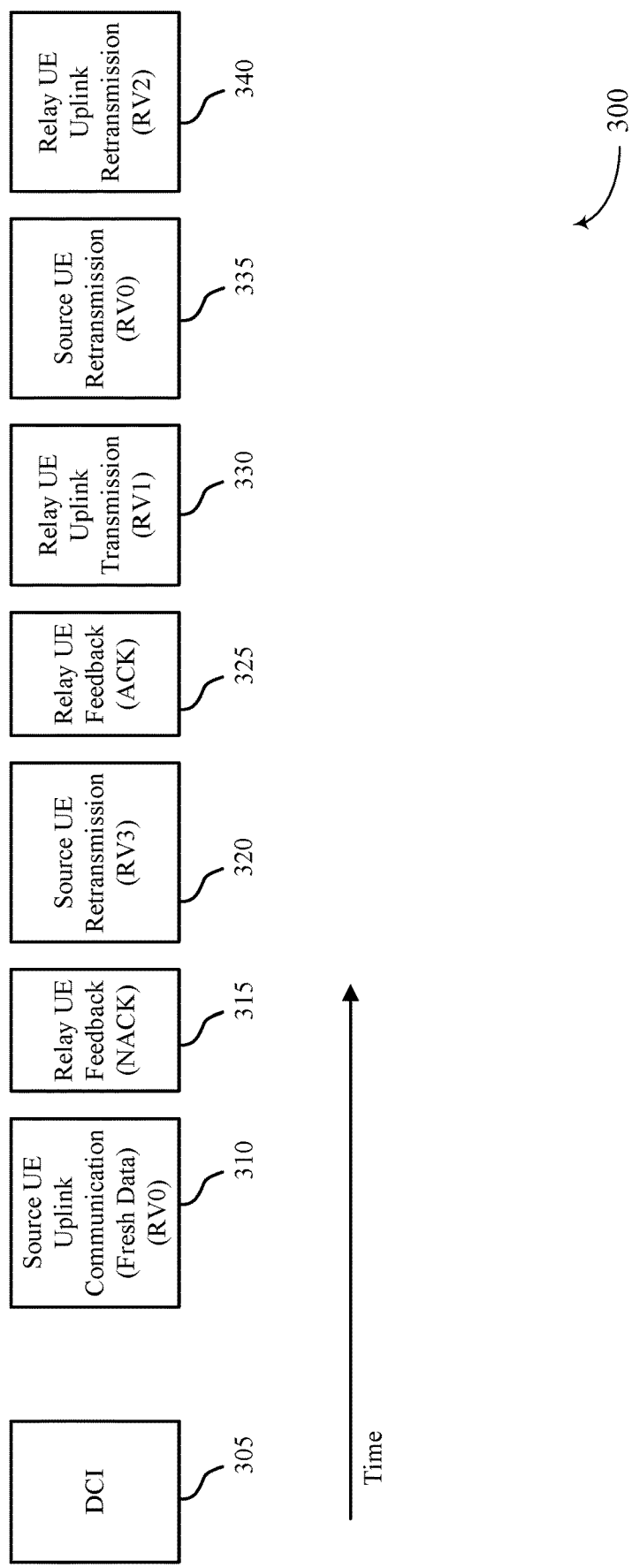
FIG. 3 illustrates an example of a communications timeline that supports per-link redundancy version assignment for uplink relays in accordance with aspects of the present disclosure.

FIG. 3 illustrates an example of a communications timeline 300 that supports per-link redundancy version assignment for uplink relays in accordance with aspects of the present disclosure. In some examples, communications timeline 300 may implement aspects of wireless communications system 100 or 200. For example, a base station 105, a source UE 115, and a relay UE 115, which may be examples of corresponding devices described herein, may communicate according to the communications timeline 300 using decode and forward techniques for enhancing uplink coverage enhancement. In some cases, the relaying technique may be implemented in sidelink communications between a source UE 115, one or more relay UEs 115, and a destination UE 115. The communications timeline 300 illustrates an example in which source and relay UEs 115 may be configured with different subsets of RV ID sequences for retransmissions of multiple instances of an uplink communication.

In the example of FIG. 3, the base station 105 may transmit DCI 305 over downlink resource, and the DCI may indicate the location (e.g., the time or frequency location) of uplink resources for uplink communications (or sidelink resources for sidelink communications), including resources for decode and forward techniques. In some aspects, the indication of the location of the various uplink and downlink resources (or sidelink resources) illustrated in the communications timeline 300 may include a quantity of time-domain resources, such as one or more of slots or symbols, associated with the beginning time of each of the allocated resources relative to the ending time of the downlink resource carrying the DCI 305. It is to be understood that the example of FIG. 3 is provided for illustration and discussion purposes, and numerous examples of communications timelines are within the scope of the present disclosure. Further, the timing illustrated in FIG. 3 is not intended to be to scale, and simply illustrates one exemplary sequence of communications.

As shown in the communications timeline 300, the source UE may transmit an uplink communication 310 to the relay UE and to a base station (or a destination UE in sidelink implementations). For example, the source UE may transmit the uplink communication 310 to the base station on a PUSCH, or may transmit the uplink communication 310 to a destination UE on a PSSCH. In this example, a first round of communications is illustrated, in which fresh data is initially transmitted by the source UE (e.g., on a PUSCH or PSSCH) prior to receiving feedback (ACK/NACK) from a relay UE or base station (e.g., such feedback may be received by the source UE on a PDCCH or a PSFCH). In some cases, the first round may have several sub-rounds in which the source UE may attempt to retransmit data to a relay UE, where the number of sub-rounds may be configured by RRC, a MAC-CE or the DCI (e.g., group/common DCI).

In this example, in order for the relay UE to be able to decode any instance of the uplink transmission of the source UE, the source UE may use only self-decodable RVs. Thus, the source UE may use a subset of RV IDs (e.g., a first subset of RV IDs) that includes only self-decodable RVs (e.g., RV sequence of {0,3,0,3}). Further, in this example, once the relay UE is able to decode the communication, it may retransmit using a different subset of RV IDs (e.g., a second subset of RV IDs, such as RV sequence of {2,1,2,1}). In the communications timeline 300, the relay UE may not successfully receive and decode the uplink communication, and may transmit a NACK feedback 315 to the source UE. For example, the relay UE may transmit the NACK feedback 315 to the source UE via sidelink communications, such as on a PSFCH. Responsive to the NACK, the source UE may transmit uplink retransmission 320 with RV3 (e.g., on a PUSCH). In this example, the relay UE may successfully receive the uplink retransmission 320, and may transmit an ACK feedback 325 to the source UE.

Figure 4:
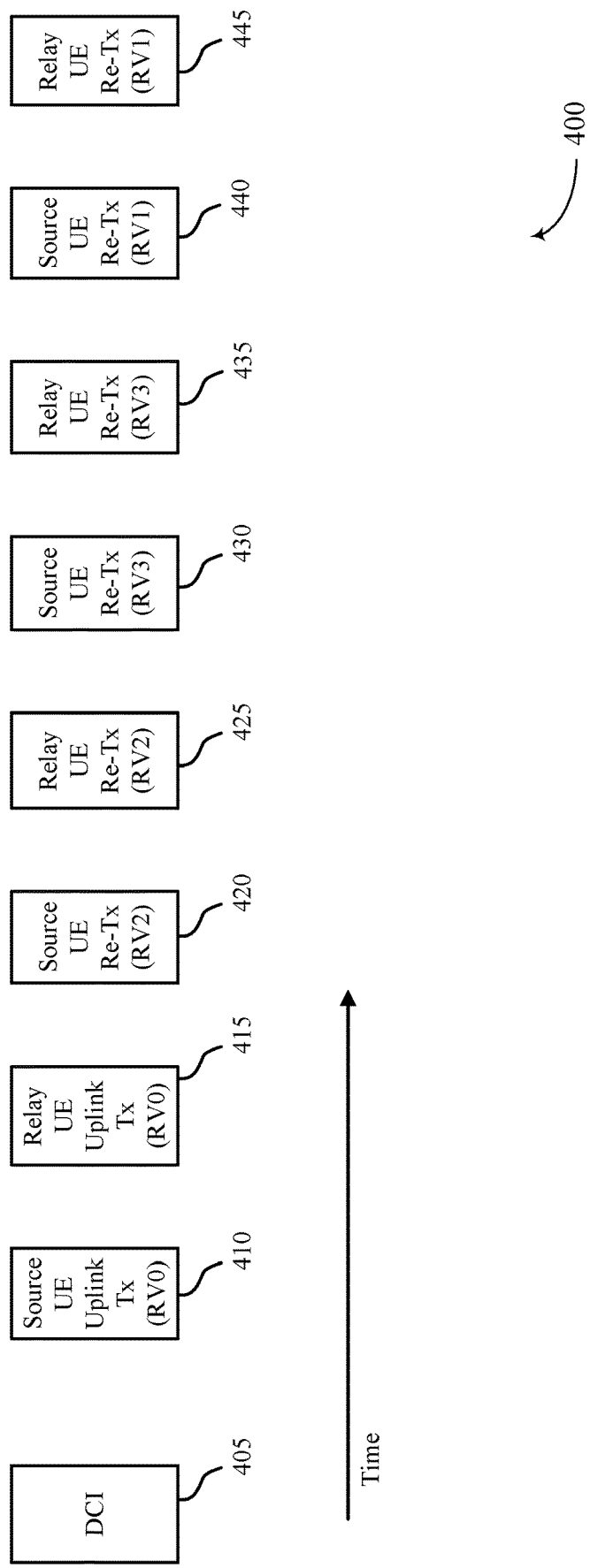
FIG. 4 illustrates an example of a communications timeline that supports per-link redundancy version assignment for uplink relays in accordance with aspects of the present disclosure.

In some cases, following the ACK feedback 325, the relay UE may not transmit, and the source UE may not monitor for, relay UE HARQ feedback associated with this particular uplink communication. The relay UE, based on successful reception of the uplink communication, may transmit a relay UE uplink communication 330 with RV1 to the base station (e.g., on a PUSCH). In this example, the source UE may transmit a further source UE retransmission 335 with RV0, and the relay UE may transmit a relay UE retransmission 340 with RV2. In such cases, the base station will receive instances of the uplink communication having a RV sequence that corresponds to the base RV sequence (e.g., RV sequence {0,2,3,1}). In some cases, the base station may successfully receive and decode the uplink communication (e.g., based on combining multiple instances of the communication), and transmit an ACK, and the source and relay UEs may discontinue this particular uplink communication. For example, the base station may transmit an ACK (e.g., to the relay UE, the source UE, or both) on a PDCCH. In cases where the base station transmits a NACK, the source UE and relay UE may move to a second round of uplink transmissions, such as illustrated in FIG. 4 for one example. For example, the base station may transmit a NACK (e.g., to the relay UE, the source UE, or both) on a PDCCH.

FIG. 4 illustrates an example of a communications timeline 400 that supports per-link redundancy version assignment for uplink relays in accordance with aspects of the present disclosure. In some examples, communications timeline 400 may implement aspects of wireless communications system 100 or 200. For example, a base station 105, a source UE 115, and a relay UE 115, which may be examples of corresponding devices described herein, may communicate according to the communications timeline 400 using decode and forward techniques for enhancing uplink coverage enhancement or sidelink communications. The communications timeline 400 illustrates an example in which source and relay UEs 115 may be configured with different subsets of RV ID sequences for a first round of retransmissions of multiple instances of an uplink communication, and may use a same base or nominal sequence of RV IDs for one or more subsequent rounds of transmissions (e.g., after the relay UE has acknowledged receipt to the source UE).

In the example of FIG. 4, the base station 105 may transmit DCI 405 over a downlink resource, and the DCI 405 may indicate the location (e.g., the time or frequency location) of uplink resources for uplink communications, including resources for decode and forward techniques. In some aspects, the indication of the location of the various uplink and downlink resources illustrated in the communications timeline 400 may include a quantity of time-domain resources, such as one or more of slots or symbols, associated with the beginning time of each of the allocated resources relative to the ending time of the downlink resource carrying the DCI. It is to be understood that the example of FIG. 4 is provided for illustration and discussion purposes, and numerous examples of communications timelines are within the scope of the present disclosure. Further, the timing illustrated in FIG. 4 is not intended to be to scale, and simply illustrates one exemplary sequence of communications.

In this example, a first round of transmissions may be completed, such as discussed with reference to the example of FIG. 3, and a subsequent round of transmissions (e.g., a second round) in this example may be initiated following a NACK indication from the base station (e.g., the base station may transmit a NACK indication to one or more UEs on a PDCCH). As shown in the communications timeline 400, the source UE may transmit an uplink communication 410 using RV0 (e.g., on a PUSCH or a PSSCH), and the relay UE may transmit an instance of the uplink transmission 415 using RV0 (e.g., on a PUSCH). In accordance with a coverage enhancement configuration (e.g., where multiple instances of a communication are transmitted), the source UE may transmit a first uplink retransmission 420 using RV2 (e.g., on a PUSCH or a PSSCH), and the relay UE may transmit first relay UE retransmission 425 also using RV2 (e.g., on a PUSCH). The source UE may then transmit a second source retransmission 430 using RV3 (e.g., on a PUSCH or a PSSCH) and the relay UE may transmit second relay UE retransmission 435 also using RV3 (e.g., on a PUSCH), followed by third source retransmission 440 using RV1 and third relay UE retransmission 445 also using RV1. In some cases, the base station may successfully receive and decode the uplink communication (e.g., based on combining multiple instances of the communication), and transmit an ACK (e.g., on a PDCCH), and the source and relay UEs may discontinue this particular uplink communication. In cases where the base station transmits a NACK, the source UE and relay UE may move to one or more subsequent rounds of uplink transmissions, such as based on a coverage enhancement or decode and forward configuration.

In this example, both the source UE and the relay UE each use the full set of RV IDs, since the base station in such a case may be aware that both the source UE and the relay UE are transmitting instances of the uplink communication, and the base station may perform combining for the uplink communications for reach UE. In this example, four instances of the uplink communication are transmitted, although this number may be larger or smaller, and may be configured by RRC, a MAC-CE, by the DCI 405, or any combinations thereof.

Figure 5:
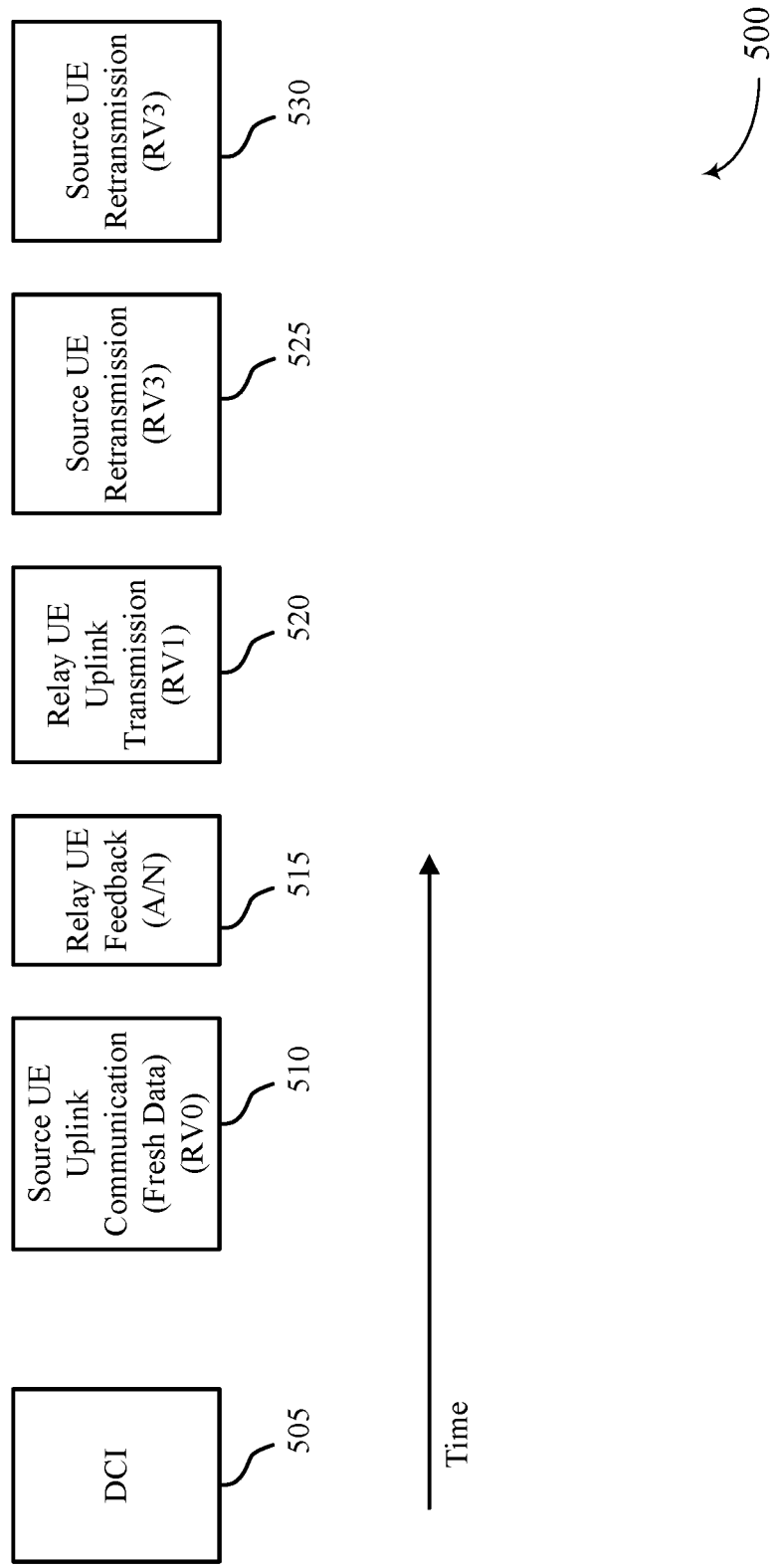
FIG. 5 illustrates an example of a communications timeline that supports per-link redundancy version assignment for uplink relays in accordance with aspects of the present disclosure.

FIG. 5 illustrates an example of a communications timeline 500 that supports per-link redundancy version assignment for uplink relays in accordance with aspects of the present disclosure. In some examples, communications timeline 500 may implement aspects of wireless communications system 100 or 200. For example, a base station 105, a source UE 115, and a relay UE 115, which may be examples of corresponding devices described herein, may communicate according to the communications timeline 500 using decode and forward techniques for enhancing uplink coverage enhancement. The communications timeline 500 illustrates an example in which source and relay UEs 115 may be configured with different subsets of RV ID sequences for a first round of retransmissions of multiple instances of an uplink communication, and may use a same base or nominal sequence of RV IDs for one or more subsequent rounds of transmissions (e.g., after the relay UE has acknowledged receipt to the source UE).

In this example, the base station 105 may transmit DCI 505 over a downlink resource, and the DCI 505 may indicate the location (e.g., the time or frequency location) of uplink resources for uplink communications, including resources for decode and forward techniques. In some aspects, the indication of the location of the various uplink and downlink resources illustrated in the communications timeline 500 may include a quantity of time-domain resources, such as one or more of slots or symbols, associated with the beginning time of each of the allocated resources relative to the ending time of the downlink resource carrying the DCI. It is to be understood that the example of FIG. 5 is provided for illustration and discussion purposes, and numerous examples of communications timelines are within the scope of the present disclosure. Further, the timing illustrated in FIG. 5 is not intended to be to scale, and simply illustrates one exemplary sequence of communications.

In this example, a first round of transmissions may be imitated, in which the source UE transmit an uplink communication 510 having fresh data with RV0. The relay UE, based on whether it is able to decode the uplink communication, may transmit HARQ feedback 515 to the source UE. In cases where the relay UE provided an ACK feedback, the relay UE may transmit relay uplink transmission 520 with RV1. The source UE may also transmit multiple source retransmissions 525 and 530, each with RV3, such that the base station may perform combining in accordance with a base RV sequence.

Figure 6:
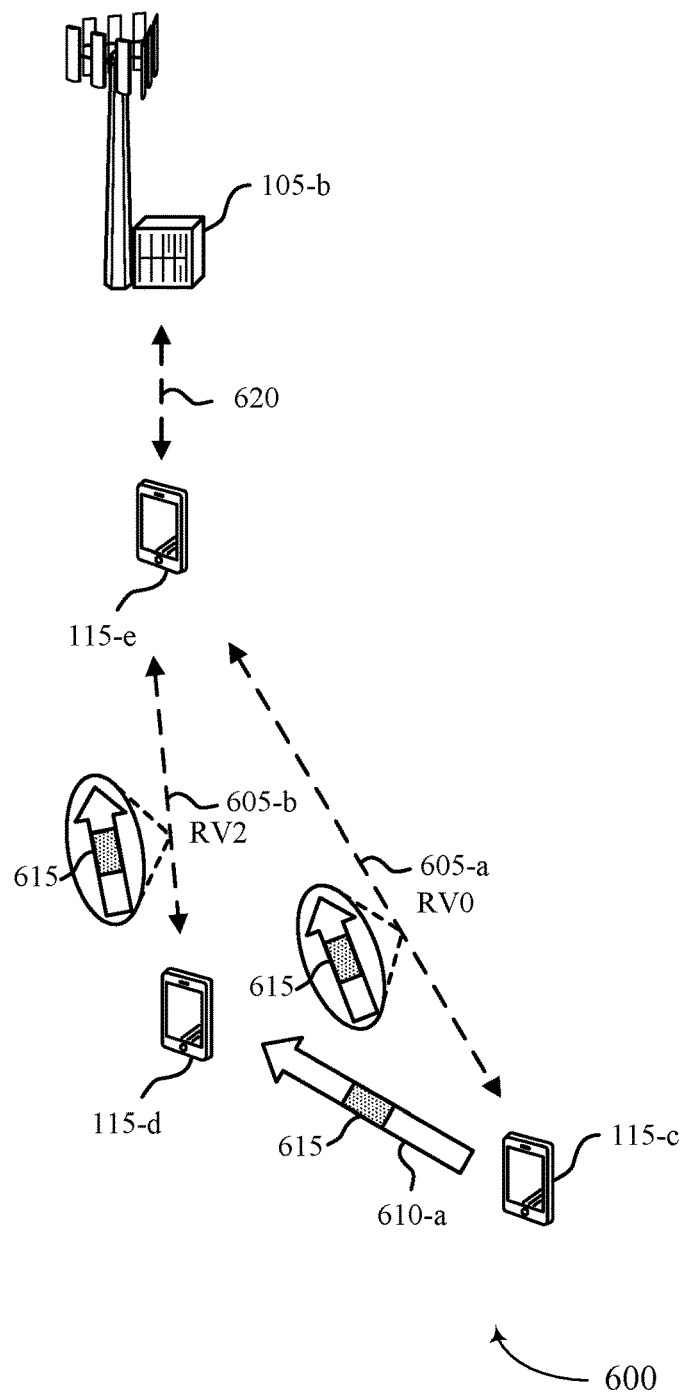
FIG. 6 illustrates an example of a wireless communications system that supports per-link redundancy version assignment for relays in sidelink communications in accordance with aspects of the present disclosure.

As discussed herein, aspects of the disclosure may be used in systems in which coverage enhancement of uplink communications with a base station 105, in sidelink communications systems for enhanced reliability of sidelink communications between UEs 115, or both. FIG. 6 illustrates an example of a wireless communications system 600 that supports per-link redundancy version assignment in sidelink communications in accordance with aspects of the present disclosure. In some examples, wireless communications system 600 may implement aspects of wireless communications system 100 or 200. The wireless communications system 600 may include a base station 105-b that may communicate with a destination UE 115-e via access link 620. The destination UE 115-e may communicate via sidelink communications with a source UE 115-c and a relay UE 115-d. In some cases, the destination UE 115-e, or source UE 115-c, may transmit one or more SCI messages to the other UEs 115 to support a decode and forward relaying procedure between the multiple UEs 115 and, in some examples, one or more of the UEs 115 may determine a RV sequence for retransmitting data that was previously unsuccessfully forwarded to the destination UE 115-e or for transmitting fresh data to the destination UE 115-e, or both.

In some cases, the source UE 115-c or the destination UE 115-e may broadcast or groupcast SCI to establish one or more decode and forward tunnels (e.g., a multi-hop tunnel) from the source UE 115-c to the destination UE 115-e via relay UE 115-d (and optionally one or more other relay UEs). Such tunneling from the source UE 115-c to the destination UE 115-e via the relay UE 115-d may include the allocation of dedicated time and frequency resources within configured sidelink resources over which the source UE 115-c may send a data transmission 615 to the destination UE 115-e, and in some cases to the base station 105-b, and the allocation of dedicated time and frequency resources over which the UE 115-e may forward the data transmission 615 to the destination UE 115-e. For instance, the source UE 115-c may transmit SCI to the relay UE 115-d and the destination UE 115-e, and the SCI may indicate a first sidelink resource over which the source UE 115-c may transmit a data transmission 615 to the destination UE 115-e over a communication link 605-a. In some examples, the destination UE 115-e and the relay UE 115-d may listen or monitor over the first sidelink resource for the data transmission 615. As shown in the wireless communications system 600, the relay UE 115-d may listen or monitor for transmissions (e.g., sidelink transmissions) from the source UE 115-c over a communication link 610-a. As such, the relay UE 115-d may monitor for the data transmission 615 from the source UE 115-c to the destination UE 115-e and, if the relay UE 115-d receives (e.g., "overhears") the data transmission 615 from the source UE 115-c, the relay UE 115-d may attempt to decode the data transmission 615 as part of the decode and forward relaying procedure.

The SCI may indicate a sidelink resource (e.g., physical sidelink feedback channel (PSFCH)) over which the destination UE 115-e or relay UE 115-d may transmit feedback to the source UE 115-c associated with the data transmission 615 from the source UE 115-c and a resource (e.g., a PSFCH resource) over which the relay UE 115-d may transmit feedback to the source UE 115-c associated with the data transmission 615. As such, the destination UE 115-e may transmit feedback to the source UE 115-c over the indicated sidelink resource based on whether the destination UE 115-e successfully or unsuccessfully receives and decodes the data transmission 615. Similarly, the relay UE 115-d may transmit an ACK or a NACK to the source UE 115-c over the indicated resource configured by the source UE 115-c based on whether the relay UE 115-d successfully or unsuccessfully receives and decodes the data transmission 615. In some cases, the source UE 115-c and the relay UE 115-d may be configured with different subset of RVs for the relayed communications, in accordance with techniques as discussed herein.

Figure 7:
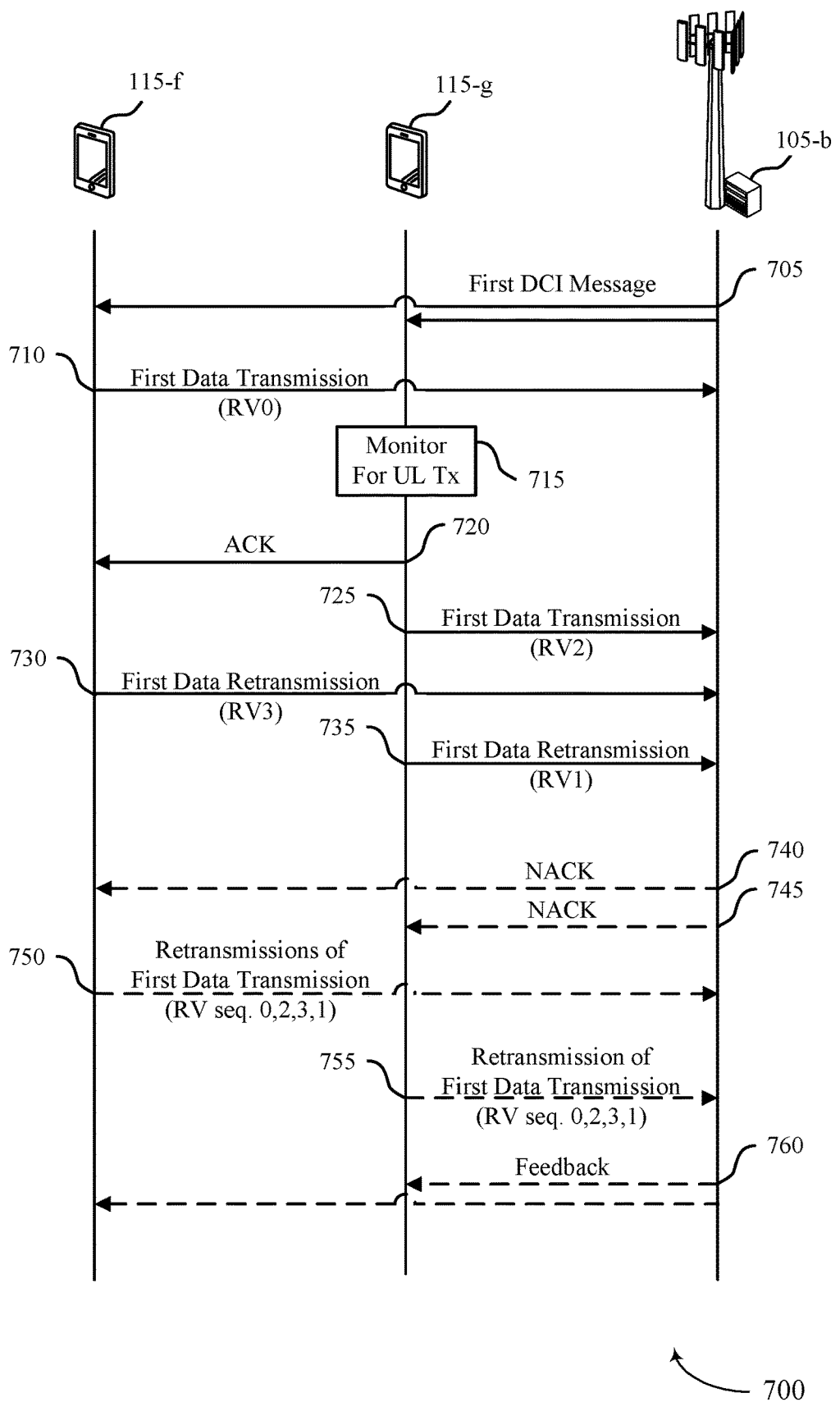
FIG. 7 illustrates an example of a process flow that supports per-link redundancy version assignment for uplink relays in accordance with aspects of the present disclosure.

FIG. 7 illustrates an example of a process flow 700 that supports per-link redundancy version assignment for uplink relays in accordance with aspects of the present disclosure. In some examples, process flow 700 may implement aspects of wireless communications system 100 or 200. The process flow 700 may illustrate communications between a base station 105-c, a UE 115-f, and a UE 115-g, which may be examples of corresponding devices described herein. For example, the UE 115-f may function as a source UE or a first UE and the UE 115-g may function as a relay UE or a second UE within a decode and forward relaying procedure for forwarding source data from the UE 115-f to the base station 105-c. In some examples, the base station 105-c may provide DCI (e.g., one or more DCI messages) to provide separate subsets of RV IDs for each UE 115 and coordinate resource usage between the UE 115-f and the UE 115-g to support greater resource efficiency or to reduce latency associated with data transmissions from the UE 115-f, or both.

At 705, the base station 105-c may transmit a first DCI message to the UE 115-f and the UE 115-g. The base station 105-c may transmit the first DCI message via broadcast or groupcast signaling. Alternatively, instead of transmitting a single first DCI message, the base station 105-c may transmit DCI messages to each of the UE 115-f and the UE 115-g separately. The base station 105-c may transmit the first DCI message (or the multiple DCI messages) to setup or otherwise establish dedicated time and frequency resources over which the UE 115-f and the UE 115-g may transmit or forward data as part of the decode and forward relaying procedure. In some examples, for instance, the first DCI message may include a first uplink grant associated with a first uplink resource over which the UE 115-f may transmit a first data transmission including source data and a second uplink grant associated with a relay UE uplink resource over which the UE 115-g may transmit a relay data transmission. In some examples, the relay data transmission from the UE 115-g may include the same source data as the first data transmission from the UE 115-f and, as such, may be equivalently referred to as or function as a relaying or forwarding of the first data transmission from the UE 115-g. In some cases, the DCI may provide an indication of a first subset of RV IDs that are to be used by the source UE 115-f and a second subset of RV IDs that are to be used by the relay UE 115-g. The indication of the subsets of RV IDs, in other cases, may be transmitted in RRC signaling, or in a MAC-CE.

At 710, the source UE 115-f may transmit the first data transmission to the base station 105-c over the first uplink resource using a first RV ID (e.g., RV0) of the configured subset of RV IDs of the source UE 115-f. At 715, the relay UE 115-g may monitor for the uplink communication from the source UE 115-f. In some examples, the relay UE 115-g may successfully receive (e.g., "overhear") and decode the first data transmission from the source UE 115-f and, at 720, may transmit an ACK to the UE 115-f based on successfully receiving and decoding the first data transmission.

At 725, the relay UE 115-g may transmit the first data transmission to the base station 105-c, using a first RV ID of the second subset of RV IDs that are configured at the relay UE 115-g (e.g., RV2). At 730, the source UE 115-f may transmit a first data retransmission using a subsequent RV ID of the first subset of RV IDs that are configured at the source UE 115-f (e.g., RV3). At 735, the relay UE 115-g also may transmit a first data retransmission using a subsequent RV ID of the second subset of RV IDs that are configured at the relay UE 115-f (e.g., RV1). Such retransmissions may continue, in some examples, according to a decode and forward configuration for a number of retransmissions, with each subsequent retransmission of the associated UE 115 using the subsequent RV ID of its configured subset of RV IDs.

In some examples, the base station 105-c may unsuccessfully receive and decode the first data transmission from the UE 115-f and, at 740, may transmit a NACK to the source UE 115-f based on unsuccessfully receiving and decoding the first data transmission. At 745, the base station 105-c may transmit a NACK to the relay UE 115-g.

At 750, the source UE 115-f may, in some implementations, transmit one or more retransmissions of the first data transmission to the base station 105-c based on the NACK indication, with each subsequent instance of the retransmissions having a RV ID selected according to the set of RV IDs, (e.g., RV seq. 0,2,3,1). At 755, the relay UE 115-g may also transmit one or more retransmissions of the first data transmission to the base station 105-c based on the NACK indication, with each subsequent instance of the retransmissions having a RV ID selected according to the set of RV IDs, (e.g., RV seq. 0,2,3,1). At 760, the base station 105-c may transmit feedback to the UE 115-f or the UE 115-g, or both. In some aspects, the base station 105-c may transmit the feedback to the UE 115-f and the UE 115-g over downlink resources assigned or otherwise associated with the uplink resources over which the UE 115-f may transmit retransmission of the first data transmission and the uplink resources over which the UE 115-g may transmit the retransmission. For example, the downlink resources over which the base station 105-c may transmit feedback may be indicated within the second DCI message including the one or more uplink grants for one or more of the retransmission of the first data transmission.

Figure 8:
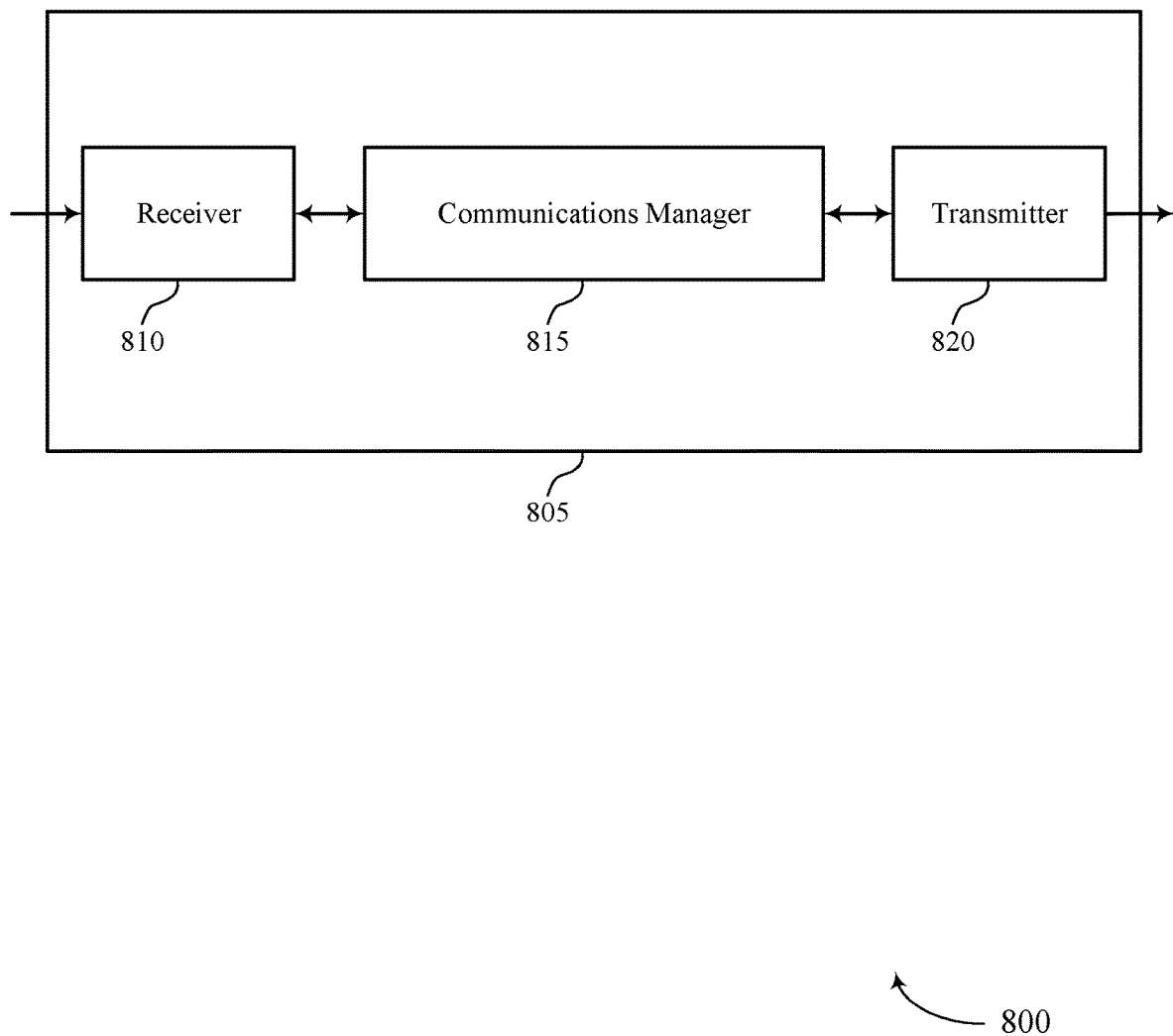
FIGS. 8 and 9 show block diagrams of devices that support per-link redundancy version assignment for uplink relays in accordance with aspects of the present disclosure.

FIG. 8 shows a block diagram 800 of a device 805 that supports per-link redundancy version assignment for uplink relays in accordance with aspects of the present disclosure. The device 805 may be an example of aspects of a UE 115 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to per-link redundancy version assignment for uplink relays, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may receive, from a base station, configuration information that indicates the relay UE is to relay uplink communications from at least a first UE to the base station, and that indicates a first subset of a sequence of RV IDs associated with communications of the first UE and a second subset of the sequence of RV IDs that are to be used for relayed uplink communications, where the first subset and the second subset are non-overlapping, receive, from the first UE, a first uplink communication having a first RV ID from the first subset of the sequence of RV IDs, and transmit, to the base station, the first uplink communication with a second RV ID from the second subset of the sequence of RV IDs.

The communications manager 815 may also receive, from a base station, configuration information that indicates a second UE is to relay uplink communications from the first UE to the base station, and that indicates a first subset of a sequence of RV IDs associated with communications of the first UE and a second subset of the sequence of RV IDs that are to be used for relayed uplink communications of the second UE, where the first subset and the second subset are non-overlapping, transmit a first uplink communication having a first RV ID from the first subset of the sequence of RV IDs, and retransmit the first uplink communication having a second RV ID from the first subset of the sequence of RV IDs. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a DSP, an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
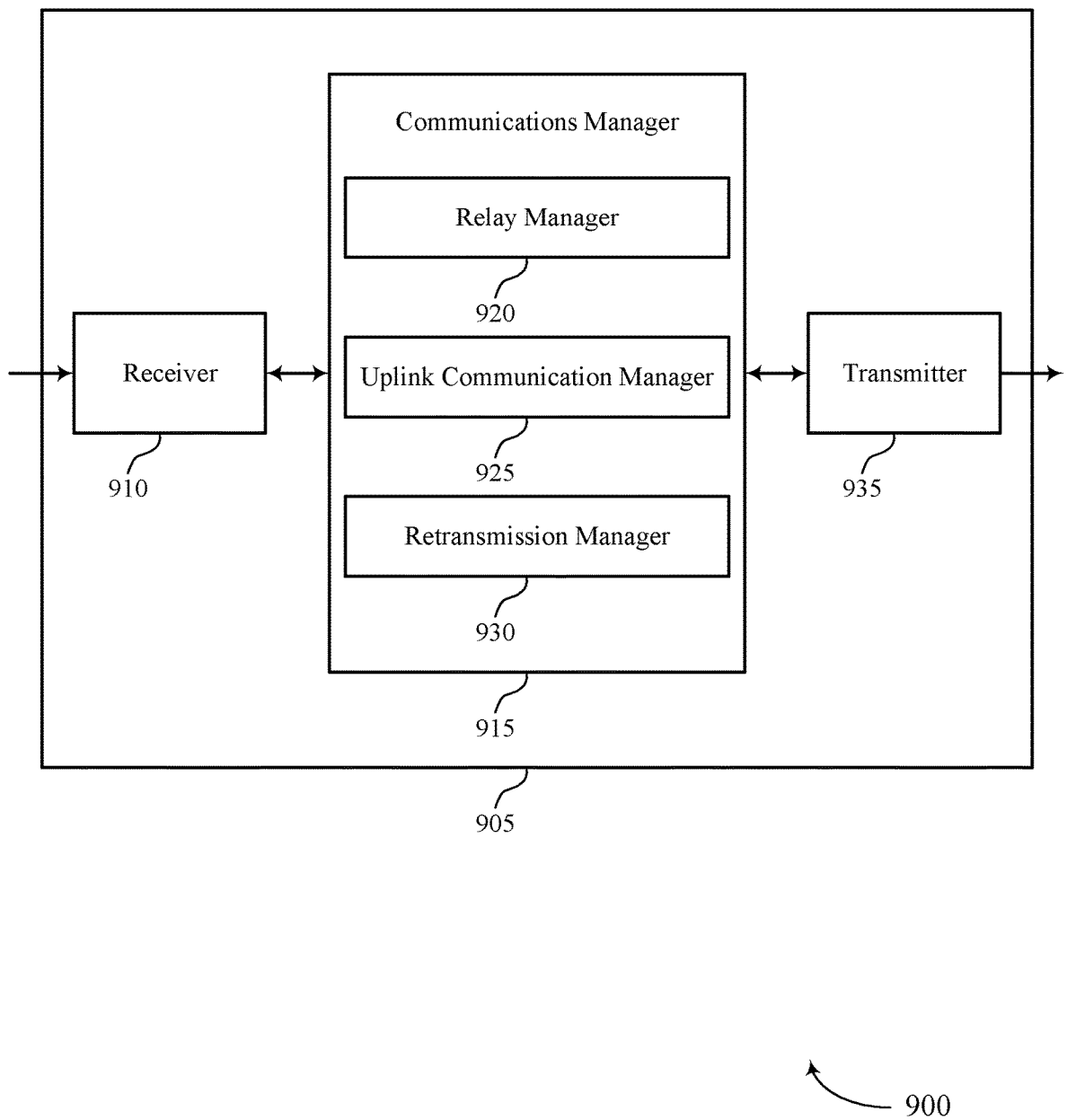

FIG. 9 shows a block diagram 900 of a device 905 that supports per-link redundancy version assignment for uplink relays in accordance with aspects of the present disclosure. The device 905 may be an example of aspects of a device 805, or a UE 115 as described herein. The device 905 may include a receiver 910, a communications manager 915, and a transmitter 935. The device 905 may also include a processor. Each of these components may be in communication with one another (e.g., via one or more buses).

The receiver 910 may receive information such as packets, user data, or control information associated with various information channels (e.g., control channels, data channels, and information related to per-link redundancy version assignment for uplink relays, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a relay manager 920, an uplink communication manager 925, and a retransmission manager 930. The communications manager 915 may be an example of aspects of the communications manager 1110 described herein.

In some cases, the relay manager 920 may receive, from a base station, configuration information that indicates the relay UE is to relay uplink communications from at least a first UE to the base station, and that indicates a first subset of a sequence of RV IDs associated with communications of the first UE and a second subset of the sequence of RV IDs that are to be used for relayed uplink communications, where the first subset and the second subset are non-overlapping. The uplink communication manager 925 may receive, from the first UE, a first uplink communication having a first RV ID from the first subset of the sequence of RV IDs. The retransmission manager 930 may transmit, to the base station, the first uplink communication with a second RV ID from the second subset of the sequence of RV IDs.

In some cases, the relay manager 920 may receive, from a base station, configuration information that indicates a second UE is to relay uplink communications from the first UE to the base station, and that indicates a first subset of a sequence of RV IDs associated with communications of the first UE and a second subset of the sequence of RV IDs that are to be used for relayed uplink communications of the second UE, where the first subset and the second subset are non-overlapping. The uplink communication manager 925 may transmit a first uplink communication having a first RV ID from the first subset of the sequence of RV IDs. The retransmission manager 930 may retransmit the first uplink communication having a second RV ID from the first subset of the sequence of RV IDs.

The transmitter 935 may transmit signals generated by other components of the device 905. In some examples, the transmitter 935 may be collocated with a receiver 910 in a transceiver module. For example, the transmitter 935 may be an example of aspects of the transceiver 1120 described with reference to FIG. 11. The transmitter 935 may utilize a single antenna or a set of antennas.

Figure 10:
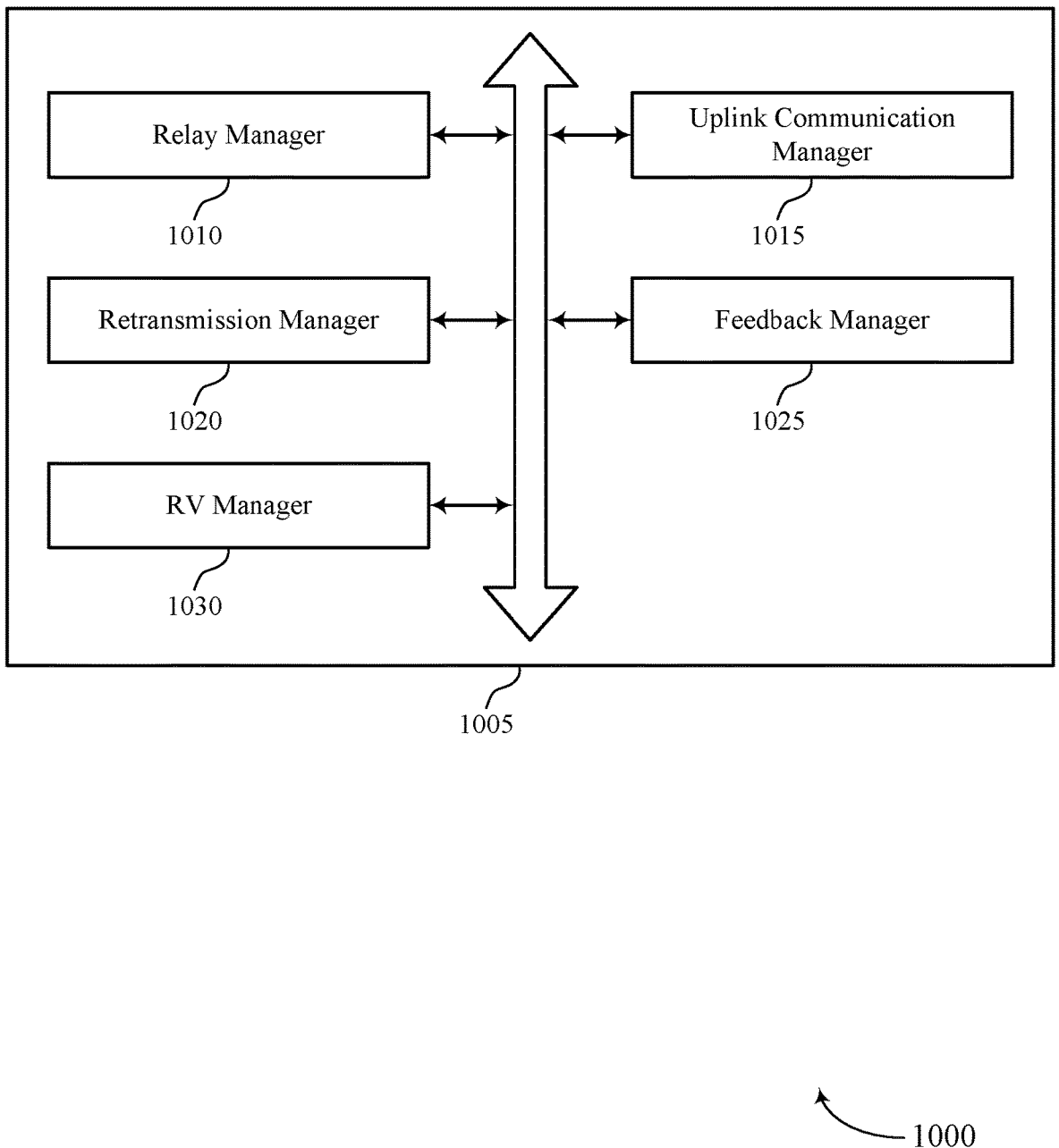
FIG. 10 shows a block diagram of a communications manager that supports per-link redundancy version assignment for uplink relays in accordance with aspects of the present disclosure.

FIG. 10 shows a block diagram 1000 of a communications manager 1005 that supports per-link redundancy version assignment for uplink relays in accordance with aspects of the present disclosure. The communications manager 1005 may be an example of aspects of a communications manager 815, a communications manager 915, or a communications manager 1110 described herein. The communications manager 1005 may include a relay manager 1010, an uplink communication manager 1015, a retransmission manager 1020, a feedback manager 1025, and a RV manager 1030. Each of these modules may communicate, directly or indirectly, with one another (e.g., via one or more buses).

The relay manager 1010 may receive, from a base station, configuration information that indicates the relay UE is to relay uplink communications from at least a first UE to the base station, and that indicates a first subset of a sequence of RV IDs associated with communications of the first UE and a second subset of the sequence of RV IDs that are to be used for relayed uplink communications, where the first subset and the second subset are non-overlapping.

In some examples, the relay manager 1010 may receive, from a base station, configuration information that indicates a second UE is to relay uplink communications from the first UE to the base station, and that indicates a first subset of a sequence of RV IDs associated with communications of the first UE and a second subset of the sequence of RV IDs that are to be used for relayed uplink communications of the second UE, where the first subset and the second subset are non-overlapping.

In some examples, the relay manager 1010 may receive a retransmission of the first uplink communication from the first UE, and where the retransmission uses a third RV ID from the first subset of the sequence of RV IDs responsive to a NACK from the second UE, and where the retransmission uses the third RV ID from either of the first subset or the second subset of the sequence of RV IDs responsive to an acknowledgment from the second UE.

In some cases, the configuration information is received from the base station in RRC signaling, in a MAC-CE, or any combinations thereof. In some cases, the configuration information includes a first number of instances that the first uplink communication is to be retransmitted prior to a feedback indication from the base station, and includes a second number of instances that the first uplink communication is to be retransmitted subsequent to a NACK feedback indication from the base station.

In some cases, the first number of instances and the second number of instances are a same or different number of instances, and where the first UE, the second UE, or both are configured to use any RV ID of the sequence of RV IDs subsequent to the NACK feedback indication from the base station. In some cases, the configuration information includes a first number of instances that the first uplink communication is to be retransmitted prior to a feedback indication from the base station, and includes a second number of instances that the first uplink communication is to be retransmitted subsequent to a NACK feedback indication from the base station. In some cases, the first number of instances and the second number of instances are a same or different number of instances, and where the first UE, the second UE, or both are configured to use any RV ID of the sequence of RV IDs subsequent to the NACK feedback indication from the base station.

The uplink communication manager 1015 may receive, from the first UE, a first uplink communication having a first RV ID from the first subset of the sequence of RV IDs. In some examples, the uplink communication manager 1015 may attempt to decode an initial instance of the first uplink communication from the first UE. In some examples, the uplink communication manager 1015 may receive a subsequent instance of the first uplink communication with an incremented RV ID from the first subset of the sequence of RV IDs.

In some examples, the uplink communication manager 1015 may transmit a first uplink communication having a first RV ID from the first subset of the sequence of RV IDs.

The retransmission manager 1020 may transmit, to the base station, the first uplink communication with a second RV ID from the second subset of the sequence of RV IDs. In some examples, the retransmission manager 1020 may receive, from the base station, a NACK associated with the first uplink communication. In some examples, the retransmission manager 1020 may retransmit the first uplink communication to the base station using a third RV ID from the second subset of the sequence of RV IDs.

In some examples, the retransmission manager 1020 may retransmit the first uplink communication having a second RV ID from the first subset of the sequence of RV IDs.

The feedback manager 1025 may transmit, to the first UE, a feedback indication that acknowledges successful receipt of the first uplink communication, and where the transmitting the first uplink communication with the second RV ID is performed responsive to the transmitting the feedback indication. In some examples, the feedback manager 1025 may transmit a NACK feedback indication to the first UE responsive to an unsuccessful attempt to decode the initial instance of the first uplink communication. In some examples, the feedback manager 1025 may transmit an acknowledgment feedback indication to the first UE responsive to successfully decoding the first uplink communication. In some examples, the feedback manager 1025 may discontinue transmitting feedback to the first UE responsive to the acknowledgment feedback indication.

In some examples, the feedback manager 1025 may receive, responsive to the transmitting the first uplink communication, a NACK from the second UE, and where the retransmitting is performed responsive to the NACK and uses an incremented RV ID from the first subset of the sequence of RV IDs. In some cases, the second UE discontinues transmitting feedback information for retransmitted instances of the first uplink communication responsive to a feedback indication that indicates successful decoding of the first uplink communication.

The RV manager 1030 may set RV IDs for communications based on a configured subset of RV IDs. In some cases, the first subset of the sequence of RV IDs are self-decodable at a receiving device. In some cases, the second RV ID is used for the retransmitting responsive to a NACK associated with the first uplink communication from the second UE, and where one or more retransmissions of the first uplink communication uses a third RV ID from either of the first subset or the second subset of the sequence of RV IDs responsive to an acknowledgment associated with the first uplink communication from the second UE.

Figure 11:
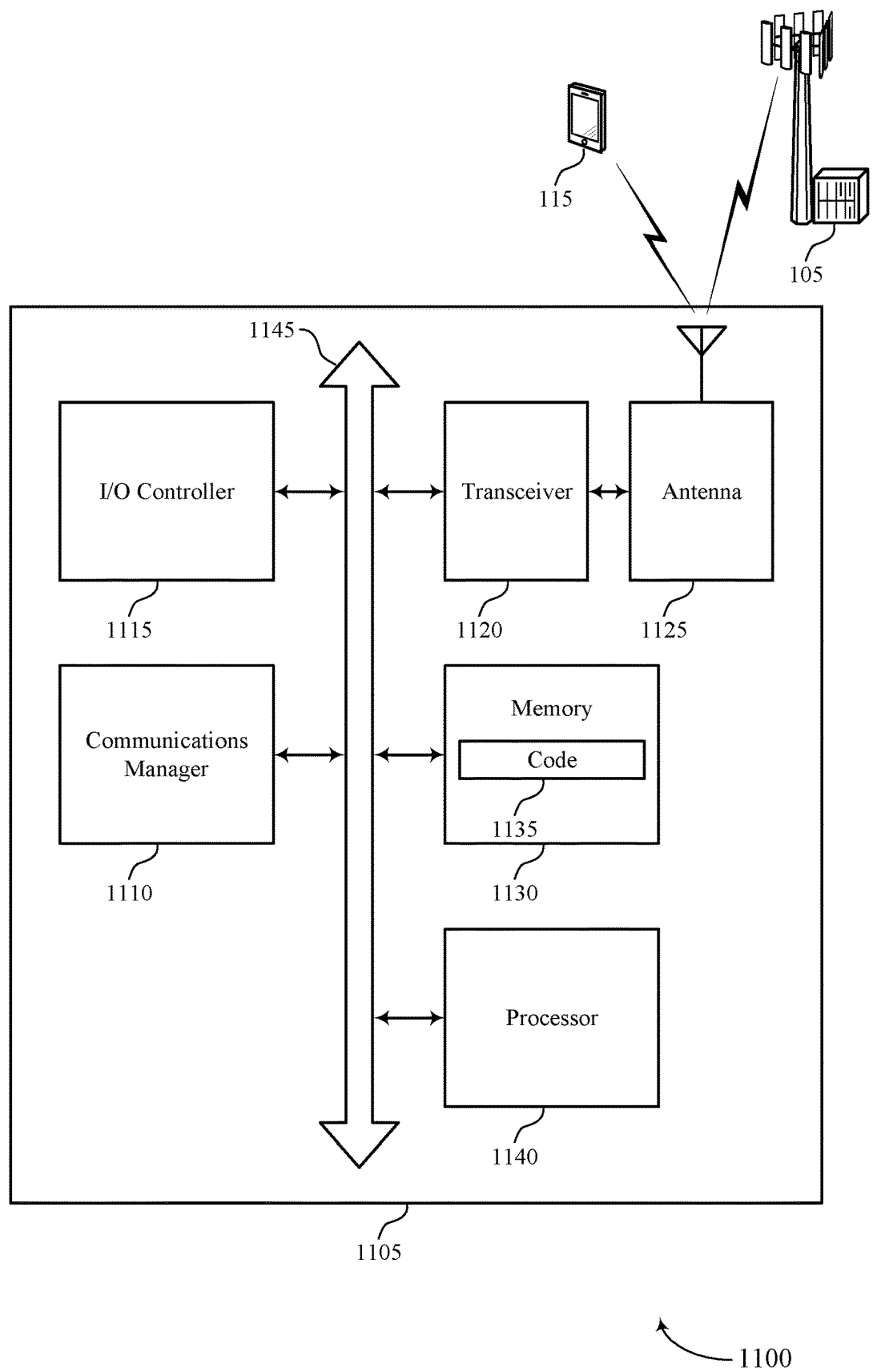
FIG. 11 shows a diagram of a system including a device that supports per-link redundancy version assignment for uplink relays in accordance with aspects of the present disclosure.

FIG. 11 shows a diagram of a system 1100 including a device 1105 that supports per-link redundancy version assignment for uplink relays in accordance with aspects of the present disclosure. The device 1105 may be an example of or include the components of device 805, device 905, or a UE 115 as described herein. The device 1105 may include components for bi-directional voice and data communications including components for transmitting and receiving communications, including a communications manager 1110, an I/O controller 1115, a transceiver 1120, an antenna 1125, memory 1130, and a processor 1140. These components may be in electronic communication via one or more buses (e.g., bus 1145).

The communications manager 1110 may receive, from a base station, configuration information that indicates the relay UE is to relay uplink communications from at least a first UE to the base station, and that indicates a first subset of a sequence of RV IDs associated with communications of the first UE and a second subset of the sequence of RV IDs that are to be used for relayed uplink communications, where the first subset and the second subset are non-overlapping, receive, from the first UE, a first uplink communication having a first RV ID from the first subset of the sequence of RV IDs, and transmit, to the base station, the first uplink communication with a second RV ID from the second subset of the sequence of RV IDs.

The communications manager 1110 may also receive, from a base station, configuration information that indicates a second UE is to relay uplink communications from the first UE to the base station, and that indicates a first subset of a sequence of RV IDs associated with communications of the first UE and a second subset of the sequence of RV IDs that are to be used for relayed uplink communications of the second UE, where the first subset and the second subset are non-overlapping, transmit a first uplink communication having a first RV ID from the first subset of the sequence of RV IDs, and retransmit the first uplink communication having a second RV ID from the first subset of the sequence of RV IDs.

The I/O controller 1115 may manage input and output signals for the device 1105. The I/O controller 1115 may also manage peripherals not integrated into the device 1105. In some cases, the I/O controller 1115 may represent a physical connection or port to an external peripheral. In some cases, the I/O controller 1115 may utilize an operating system such as iOS®, ANDROID®, MS-DOS®, MS-WINDOWS®, OS/2®, UNIX®, LINUX®, or another known operating system. In other cases, the I/O controller 1115 may represent or interact with a modem, a keyboard, a mouse, a touchscreen, or a similar device. In some cases, the I/O controller 1115 may be implemented as part of a processor. In some cases, a user may interact with the device 1105 via the I/O controller 1115 or via hardware components controlled by the I/O controller 1115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include random-access memory (RAM) and read-only memory (ROM). The memory 1130 may store computer-readable, computer-executable code 1135 including instructions that, when executed, cause the processor to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting per-link redundancy version assignment for uplink relays).

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
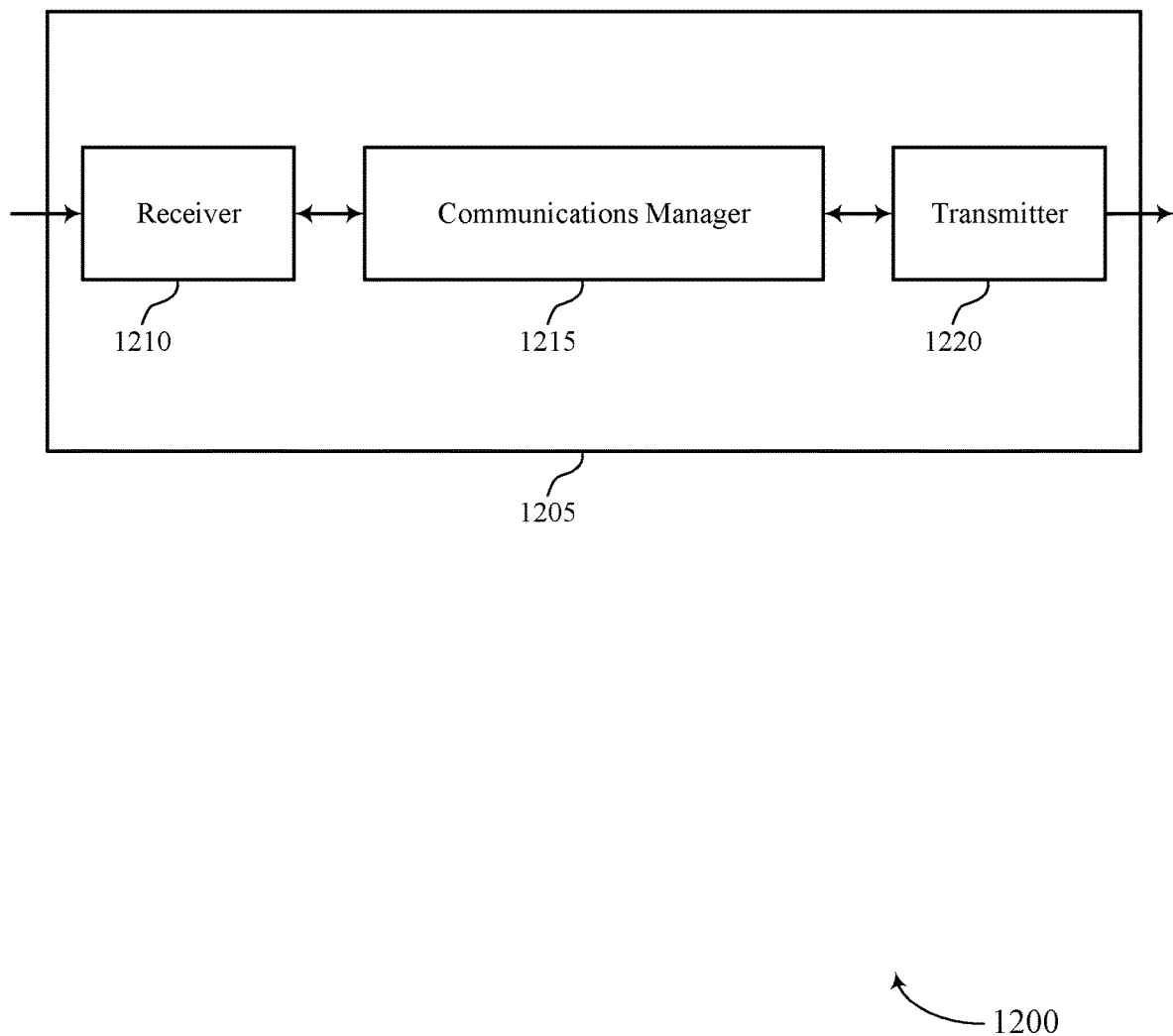
FIGS. 12 and 13 show block diagrams of devices that support per-link redundancy version assignment for uplink relays in accordance with aspects of the present disclosure.

FIG. 12 shows a block diagram 1200 of a device 1205 that supports per-link redundancy version assignment for uplink relays in accordance with aspects of the present disclosure. The device 1205 may be an example of aspects of a base station 105 as described herein. The device 1205 may include a receiver 1210, a communications manager 1215, and a transmitter 1220. The device 1205 may also include a processor. Each of these components may be in communication with one another (e.g., via one or more buses).

The receiver 1210 may receive information such as packets, user data, or control information associated with various information channels (e.g., control channels, data channels, and information related to per-link redundancy version assignment for uplink relays, etc.). Information may be passed on to other components of the device 1205. The receiver 1210 may be an example of aspects of the transceiver 1520 described with reference to FIG. 15. The receiver 1210 may utilize a single antenna or a set of antennas.

The communications manager 1215 may transmit, to a source UE and a relay UE, configuration information that indicates the relay UE is to relay uplink communications from the source UE to the base station, and that indicates a first subset of a sequence of RV IDs associated with communications of the source UE and a second subset of the sequence of RV IDs that are to be used for relayed uplink communications of the relay UE, where the first subset and the second subset are non-overlapping, receive, from the source UE, a first uplink communication having a first RV ID from the first subset of the sequence of RV IDs, and receive, from the relay UE, a retransmission of the first uplink communication having a second RV ID from the first subset of the sequence of RV IDs. The communications manager 1215 may be an example of aspects of the communications manager 1510 described herein.

The communications manager 1215, or its sub-components, may be implemented in hardware, code (e.g., software or firmware) executed by a processor, or any combination thereof. If implemented in code executed by a processor, the functions of the communications manager 1215, or its sub-components may be executed by a general-purpose processor, a DSP, an application-specific integrated circuit (ASIC), an FPGA or other programmable logic device, discrete gate or transistor logic, discrete hardware components, or any combination thereof designed to perform the functions described in the present disclosure.

The communications manager 1215, or its sub-components, may be physically located at various positions, including being distributed such that portions of functions are implemented at different physical locations by one or more physical components. In some examples, the communications manager 1215, or its sub-components, may be a separate and distinct component in accordance with various aspects of the present disclosure. In some examples, the communications manager 1215, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1220 may transmit signals generated by other components of the device 1205. In some examples, the transmitter 1220 may be collocated with a receiver 1210 in a transceiver module. For example, the transmitter 1220 may be an example of aspects of the transceiver 1520 described with reference to FIG. 15. The transmitter 1220 may utilize a single antenna or a set of antennas.

Figure 13:
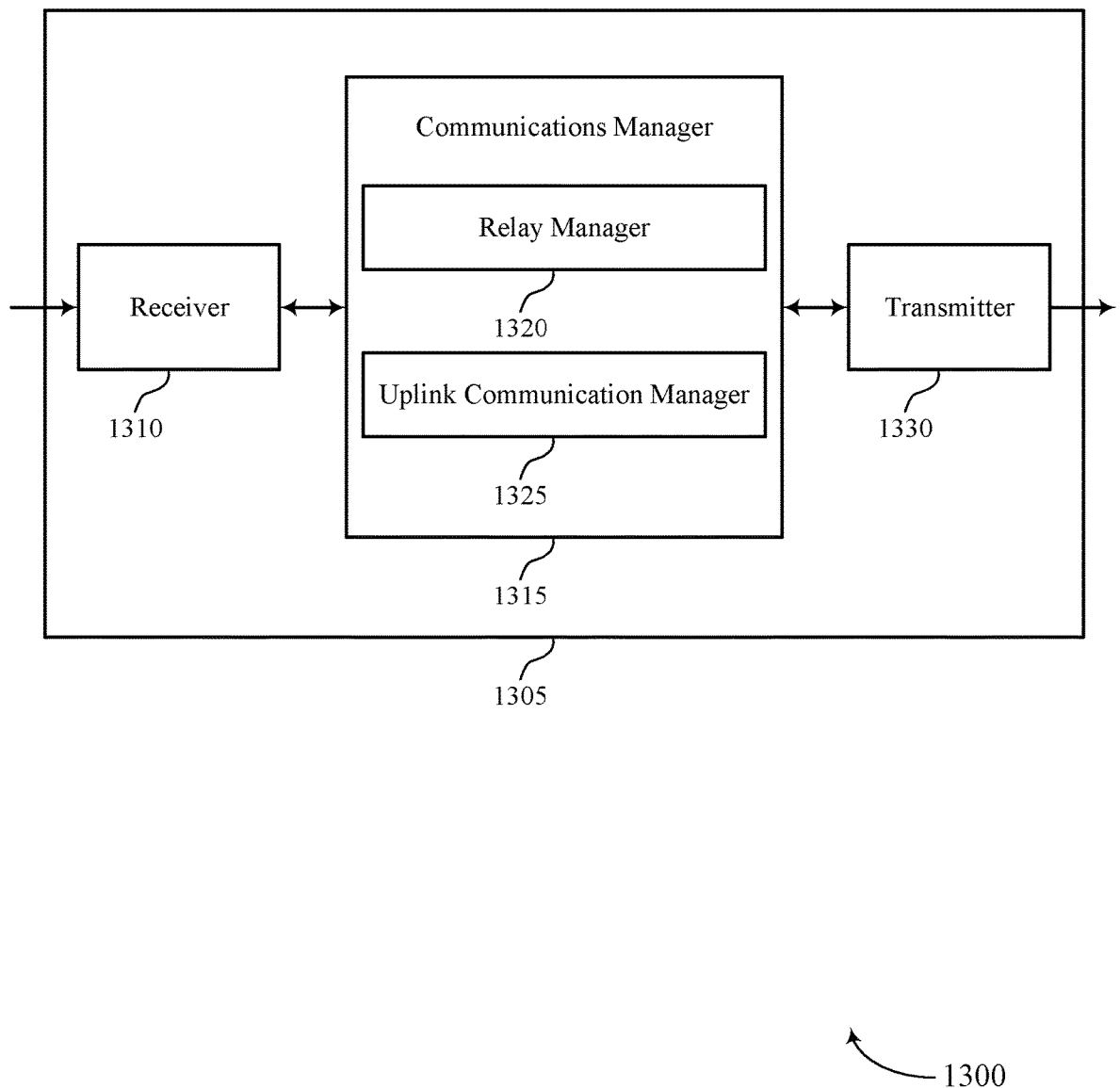

FIG. 13 shows a block diagram 1300 of a device 1305 that supports per-link redundancy version assignment for uplink relays in accordance with aspects of the present disclosure. The device 1305 may be an example of aspects of a device 1205, or a base station 105 as described herein. The device 1305 may include a receiver 1310, a communications manager 1315, and a transmitter 1330. The device 1305 may also include a processor. Each of these components may be in communication with one another (e.g., via one or more buses).

The receiver 1310 may receive information such as packets, user data, or control information associated with various information channels (e.g., control channels, data channels, and information related to per-link redundancy version assignment for uplink relays, etc.). Information may be passed on to other components of the device 1305. The receiver 1310 may be an example of aspects of the transceiver 1520 described with reference to FIG. 15. The receiver 1310 may utilize a single antenna or a set of antennas.

The communications manager 1315 may be an example of aspects of the communications manager 1215 as described herein. The communications manager 1315 may include a relay manager 1320 and an uplink communication manager 1325. The communications manager 1315 may be an example of aspects of the communications manager 1510 described herein.

The relay manager 1320 may transmit, to a source UE and a relay UE, configuration information that indicates the relay UE is to relay uplink communications from the source UE to the base station, and that indicates a first subset of a sequence of RV IDs associated with communications of the source UE and a second subset of the sequence of RV IDs that are to be used for relayed uplink communications of the relay UE, where the first subset and the second subset are non-overlapping.

The uplink communication manager 1325 may receive, from the source UE, a first uplink communication having a first RV ID from the first subset of the sequence of RV IDs and receive, from the relay UE, a retransmission of the first uplink communication having a second RV ID from the first subset of the sequence of RV IDs.

The transmitter 1330 may transmit signals generated by other components of the device 1305. In some examples, the transmitter 1330 may be collocated with a receiver 1310 in a transceiver module. For example, the transmitter 1330 may be an example of aspects of the transceiver 1520 described with reference to FIG. 15. The transmitter 1330 may utilize a single antenna or a set of antennas.

Figure 14:
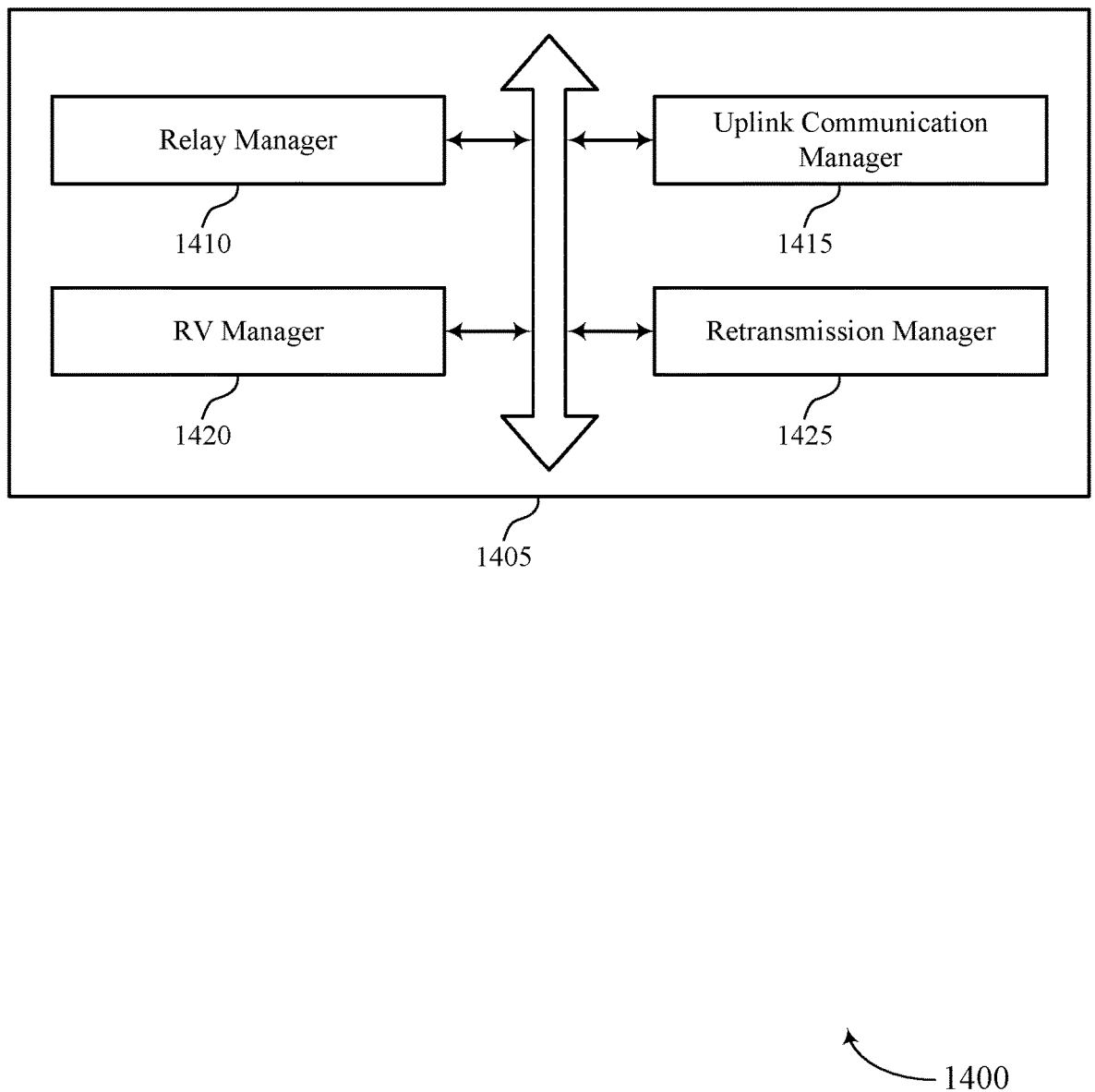
FIG. 14 shows a block diagram of a communications manager that supports per-link redundancy version assignment for uplink relays in accordance with aspects of the present disclosure.

FIG. 14 shows a block diagram 1400 of a communications manager 1405 that supports per-link redundancy version assignment for uplink relays in accordance with aspects of the present disclosure. The communications manager 1405 may be an example of aspects of a communications manager 1215, a communications manager 1315, or a communications manager 1510 described herein. The communications manager 1405 may include a relay manager 1410, an uplink communication manager 1415, a RV manager 1420, and a retransmission manager 1425. Each of these modules may communicate, directly or indirectly, with one another (e.g., via one or more buses).

The relay manager 1410 may transmit, to a source UE and a relay UE, configuration information that indicates the relay UE is to relay uplink communications from the source UE to the base station, and that indicates a first subset of a sequence of RV IDs associated with communications of the source UE and a second subset of the sequence of RV IDs that are to be used for relayed uplink communications of the relay UE, where the first subset and the second subset are non-overlapping. In some cases, the configuration information is transmitted in RRC signaling, in a MAC-CE, or any combinations thereof. In some cases, the configuration information includes a first number of instances that the first uplink communication is to be retransmitted prior to a feedback indication from the base station, and includes a second number of instances that the first uplink communication is to be retransmitted subsequent to a NACK feedback indication from the base station. In some cases, the first number of instances and the second number of instances are a same or different number of instances, and where the source UE, the relay UE, or both are configured to use any RV ID of the sequence of RV IDs subsequent to the NACK feedback indication from the base station.

The uplink communication manager 1415 may receive, from the source UE, a first uplink communication having a first RV ID from the first subset of the sequence of RV IDs. In some examples, the uplink communication manager 1415 may receive, from the relay UE, a retransmission of the first uplink communication having a second RV ID from the first subset of the sequence of RV IDs.

The RV manager 1420 may manage subsets of RV IDS for UEs. In some cases, the first subset of the sequence of RV IDs are self-decodable at a receiving device.

The retransmission manager 1425 may receive a retransmission of the first uplink communication from the source UE, and where the retransmission uses a third RV ID from the first subset of the sequence of RV IDs responsive to a NACK from the relay UE, and where the retransmission uses the third RV ID from either of the first subset or the second subset of the sequence of RV IDs responsive to an acknowledgment from the relay UE. In some examples, the retransmission manager 1425 may receive one or more retransmissions of the first uplink communication from the relay UE with an incremented RV ID from the second subset of the sequence of RV IDs.

Figure 15:
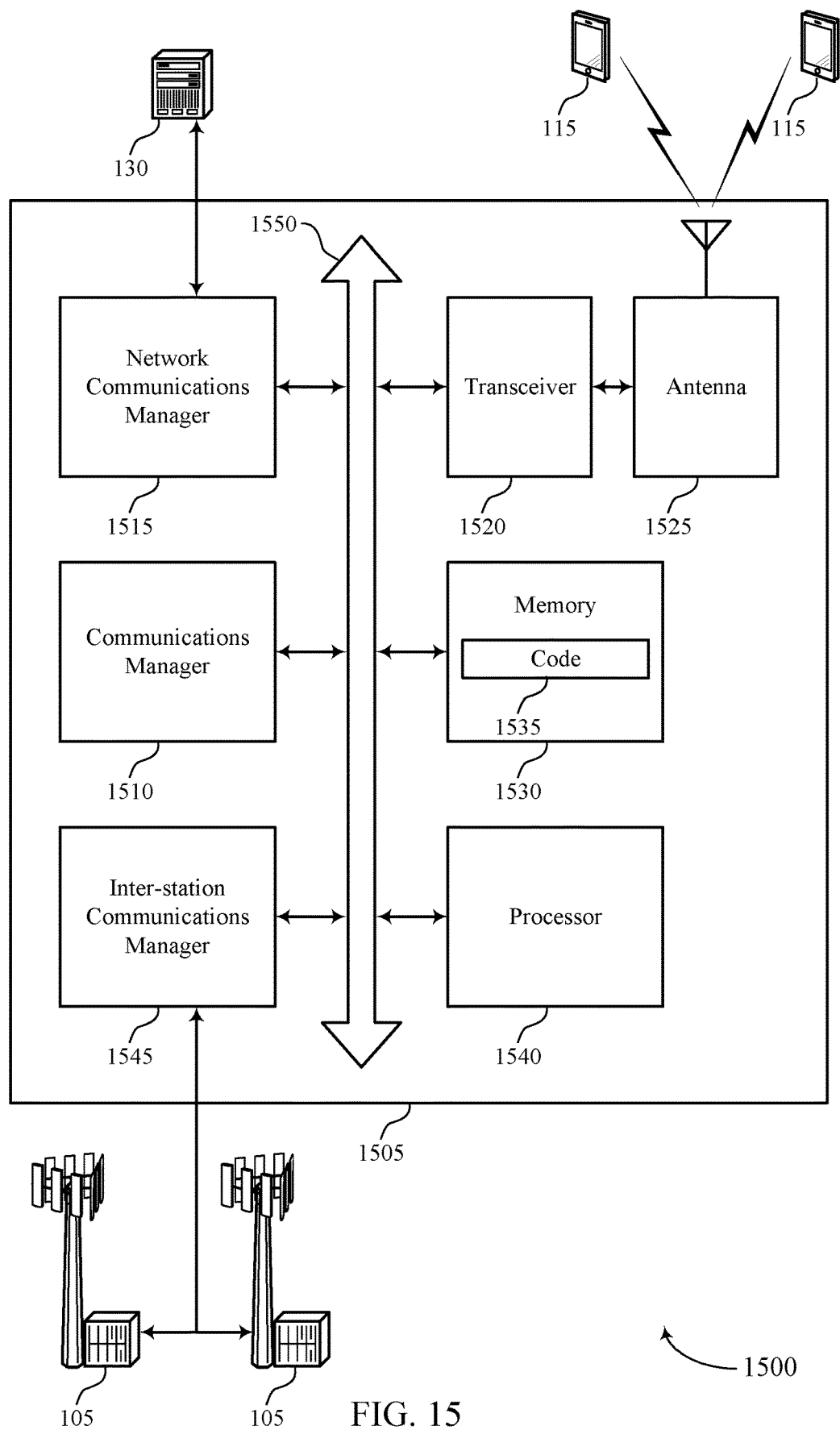
FIG. 15 shows a diagram of a system including a device that supports per-link redundancy version assignment for uplink relays in accordance with aspects of the present disclosure.

FIG. 15 shows a diagram of a system 1500 including a device 1505 that supports per-link redundancy version assignment for uplink relays in accordance with aspects of the present disclosure. The device 1505 may be an example of or include the components of device 1205, device 1305, or a base station 105 as described herein. The device 1505 may include components for bi-directional voice and data communications including components for transmitting and receiving communications, including a communications manager 1510, a network communications manager 1515, a transceiver 1520, an antenna 1525, memory 1530, a processor 1540, and an inter-station communications manager 1545. These components may be in electronic communication via one or more buses (e.g., bus 1550).

The communications manager 1510 may transmit, to a source UE and a relay UE, configuration information that indicates the relay UE is to relay uplink communications from the source UE to the base station, and that indicates a first subset of a sequence of RV IDs associated with communications of the source UE and a second subset of the sequence of RV IDs that are to be used for relayed uplink communications of the relay UE, where the first subset and the second subset are non-overlapping, receive, from the source UE, a first uplink communication having a first RV ID from the first subset of the sequence of RV IDs, and receive, from the relay UE, a retransmission of the first uplink communication having a second RV ID from the first subset of the sequence of RV IDs.

The network communications manager 1515 may manage communications with the core network (e.g., via one or more wired backhaul links). For example, the network communications manager 1515 may manage the transfer of data communications for client devices, such as one or more UEs 115.

The transceiver 1520 may communicate bi-directionally, via one or more antennas, wired, or wireless links as described above. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas.

In some cases, the wireless device may include a single antenna 1525. However, in some cases the device may have more than one antenna 1525, which may be capable of concurrently transmitting or receiving multiple wireless transmissions.

The memory 1530 may include RAM, ROM, or a combination thereof. The memory 1530 may store computer-readable code 1535 including instructions that, when executed by a processor (e.g., the processor 1540) cause the device to perform various functions described herein. In some cases, the memory 1530 may contain, among other things, a BIOS which may control basic hardware or software operation such as the interaction with peripheral components or devices.

The processor 1540 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some cases, a memory controller may be integrated into processor 1540. The processor 1540 may be configured to execute computer-readable instructions stored in a memory (e.g., the memory 1530) to cause the device 1505 to perform various functions (e.g., functions or tasks supporting per-link redundancy version assignment for uplink relays).

The inter-station communications manager 1545 may manage communications with other base station 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communication network technology to provide communication between base stations 105.

The code 1535 may include instructions to implement aspects of the present disclosure, including instructions to support wireless communications. The code 1535 may be stored in a non-transitory computer-readable medium such as system memory or other type of memory. In some cases, the code 1535 may not be directly executable by the processor 1540 but may cause a computer (e.g., when compiled and executed) to perform functions described herein.

Figure 16:
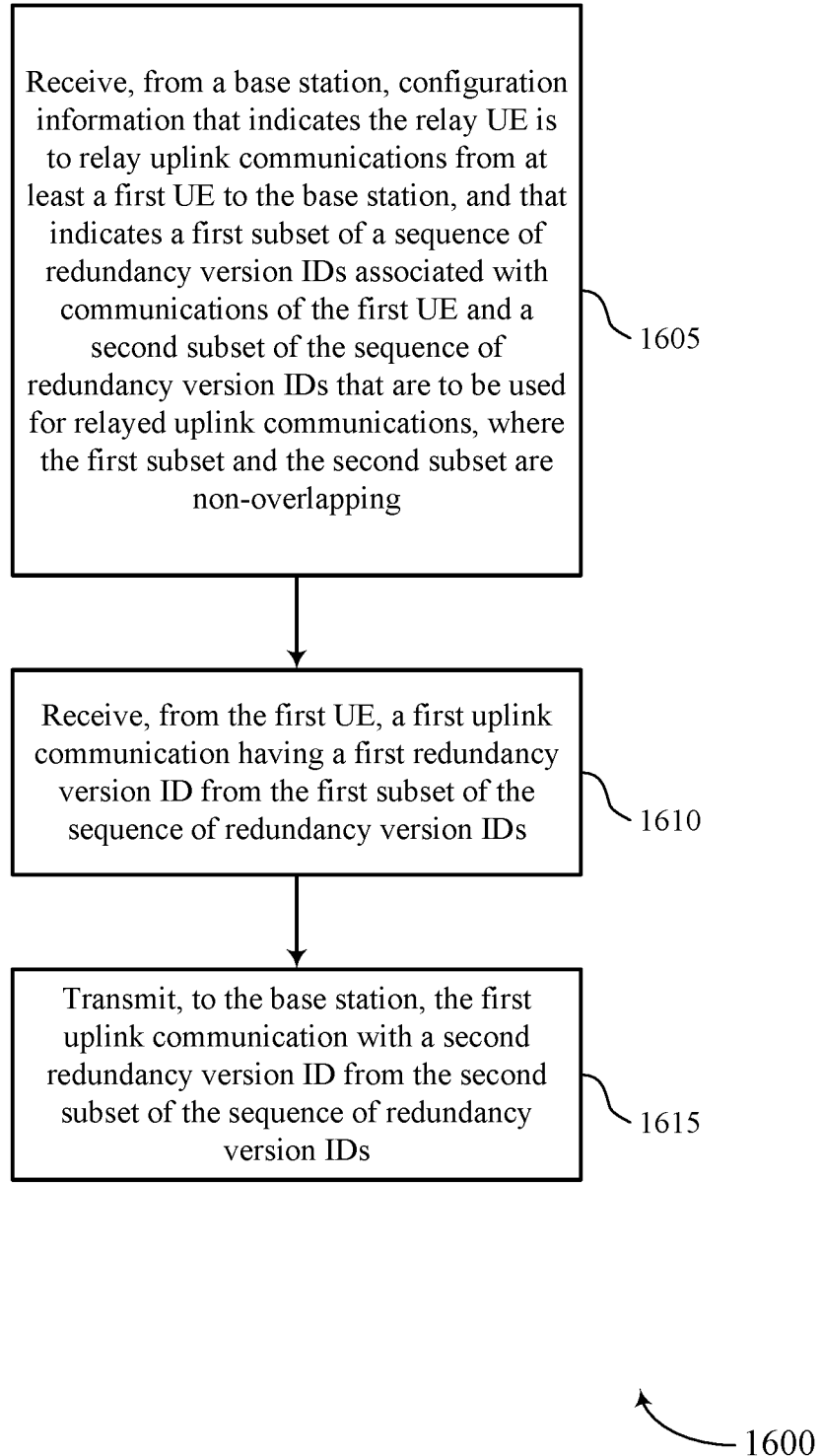
FIGS. 16 through 24 show flowcharts illustrating methods that support per-link redundancy version assignment for uplink relays in accordance with aspects of the present disclosure.

FIG. 16 shows a flowchart illustrating a method 1600 that supports per-link redundancy version assignment for uplink relays in accordance with aspects of the present disclosure. The operations of method 1600 may be implemented by a UE 115 or its components as described herein. For example, the operations of method 1600 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1605, the UE may receive, from a base station, configuration information that indicates the relay UE is to relay uplink communications from at least a first UE to the base station, and that indicates a first subset of a sequence of RV IDs associated with communications of the first UE and a second subset of the sequence of RV IDs that are to be used for relayed uplink communications, where the first subset and the second subset are non-overlapping. The operations of 1605 may be performed according to the methods described herein. In some examples, aspects of the operations of 1605 may be performed by a relay manager as described with reference to FIGS. 8 through 11.

At 1610, the UE may receive, from the first UE, a first uplink communication having a first RV ID from the first subset of the sequence of RV IDs. The operations of 1610 may be performed according to the methods described herein. In some examples, aspects of the operations of 1610 may be performed by an uplink communication manager as described with reference to FIGS. 8 through 11.

At 1615, the UE may transmit, to the base station, the first uplink communication with a second RV ID from the second subset of the sequence of RV IDs. The operations of 1615 may be performed according to the methods described herein. In some examples, aspects of the operations of 1615 may be performed by a retransmission manager as described with reference to FIGS. 8 through 11.

Figure 17:
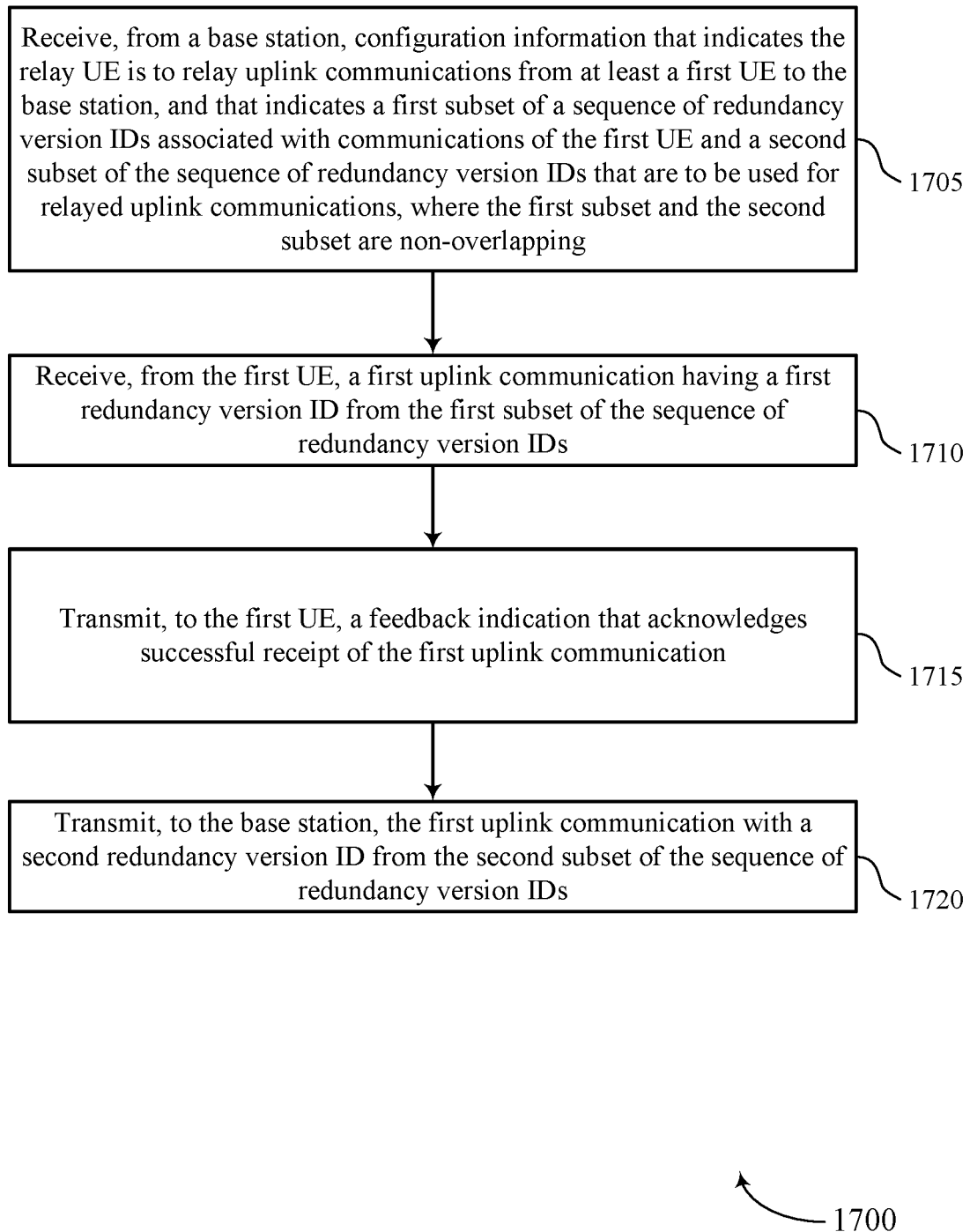

FIG. 17 shows a flowchart illustrating a method 1700 that supports per-link redundancy version assignment for uplink relays in accordance with aspects of the present disclosure. The operations of method 1700 may be implemented by a UE 115 or its components as described herein. For example, the operations of method 1700 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1705, the UE may receive, from a base station, configuration information that indicates the relay UE is to relay uplink communications from at least a first UE to the base station, and that indicates a first subset of a sequence of RV IDs associated with communications of the first UE and a second subset of the sequence of RV IDs that are to be used for relayed uplink communications, where the first subset and the second subset are non-overlapping. The operations of 1705 may be performed according to the methods described herein. In some examples, aspects of the operations of 1705 may be performed by a relay manager as described with reference to FIGS. 8 through 11.

At 1710, the UE may receive, from the first UE, a first uplink communication having a first RV ID from the first subset of the sequence of RV IDs. The operations of 1710 may be performed according to the methods described herein. In some examples, aspects of the operations of 1710 may be performed by an uplink communication manager as described with reference to FIGS. 8 through 11.

At 1715, the UE may transmit, to the first UE, a feedback indication that acknowledges successful receipt of the first uplink communication. The operations of 1715 may be performed according to the methods described herein. In some examples, aspects of the operations of 1715 may be performed by a feedback manager as described with reference to FIGS. 8 through 11.

At 1720, the UE may transmit, to the base station, the first uplink communication with a second RV ID from the second subset of the sequence of RV IDs. The operations of 1720 may be performed according to the methods described herein. In some examples, aspects of the operations of 1720 may be performed by a retransmission manager as described with reference to FIGS. 8 through 11.

Figure 18:
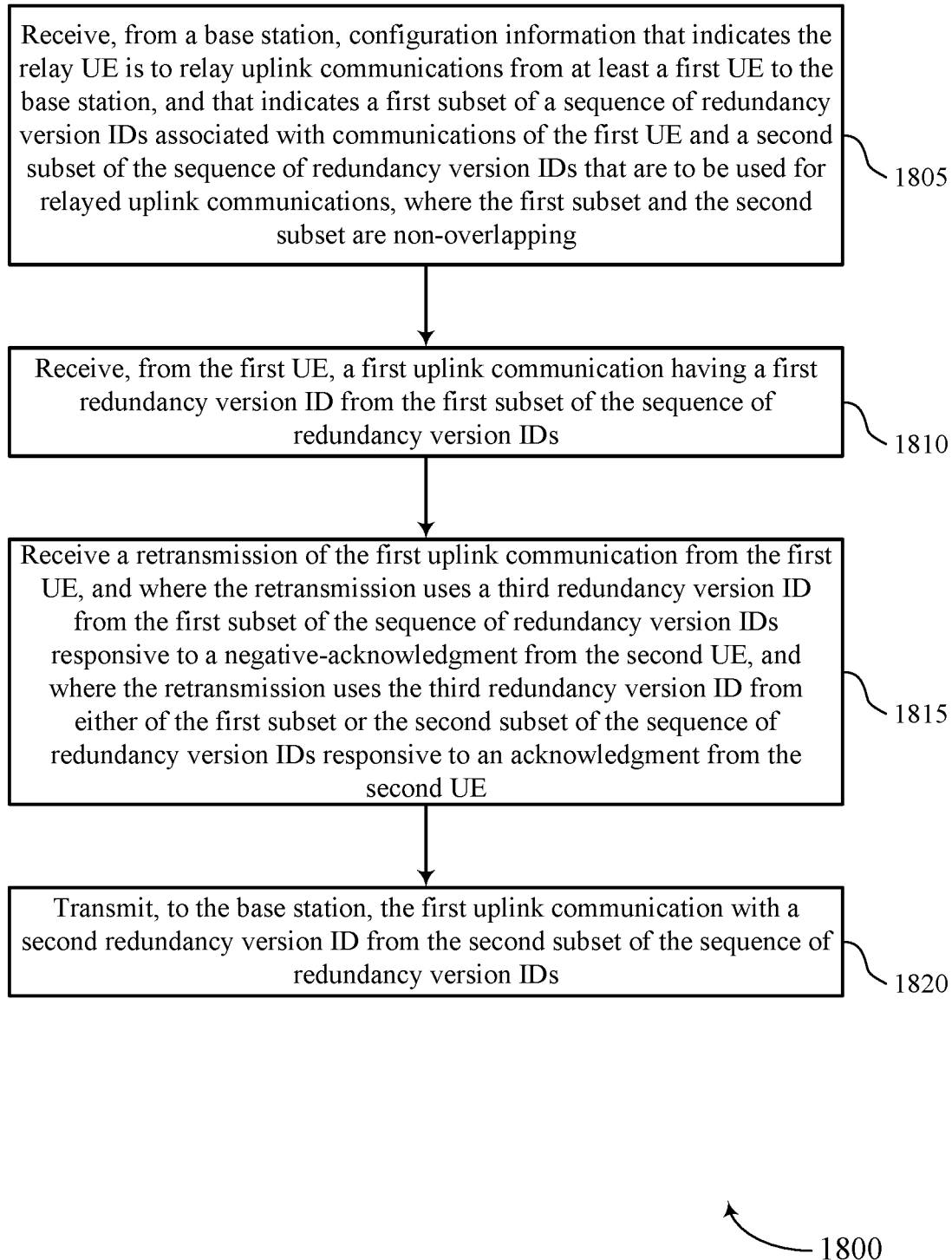

FIG. 18 shows a flowchart illustrating a method 1800 that supports per-link redundancy version assignment for uplink relays in accordance with aspects of the present disclosure. The operations of method 1800 may be implemented by a UE 115 or its components as described herein. For example, the operations of method 1800 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1805, the UE may receive, from a base station, configuration information that indicates the relay UE is to relay uplink communications from at least a first UE to the base station, and that indicates a first subset of a sequence of RV IDs associated with communications of the first UE and a second subset of the sequence of RV IDs that are to be used for relayed uplink communications, where the first subset and the second subset are non-overlapping. The operations of 1805 may be performed according to the methods described herein. In some examples, aspects of the operations of 1805 may be performed by a relay manager as described with reference to FIGS. 8 through 11.

At 1810, the UE may receive, from the first UE, a first uplink communication having a first RV ID from the first subset of the sequence of RV IDs. The operations of 1810 may be performed according to the methods described herein. In some examples, aspects of the operations of 1810 may be performed by an uplink communication manager as described with reference to FIGS. 8 through 11.

At 1815, the UE may receive a retransmission of the first uplink communication from the first UE, and where the retransmission uses a third RV ID from the first subset of the sequence of RV IDs responsive to a NACK from the second UE, and where the retransmission uses the third RV ID from either of the first subset or the second subset of the sequence of RV IDs responsive to an acknowledgment from the second UE. The operations of 1815 may be performed according to the methods described herein. In some examples, aspects of the operations of 1815 may be performed by a relay manager as described with reference to FIGS. 8 through 11.

At 1820, the UE may transmit, to the base station, the first uplink communication with a second RV ID from the second subset of the sequence of RV IDs. The operations of 1820 may be performed according to the methods described herein. In some examples, aspects of the operations of 1820 may be performed by a retransmission manager as described with reference to FIGS. 8 through 11.

Figure 19:
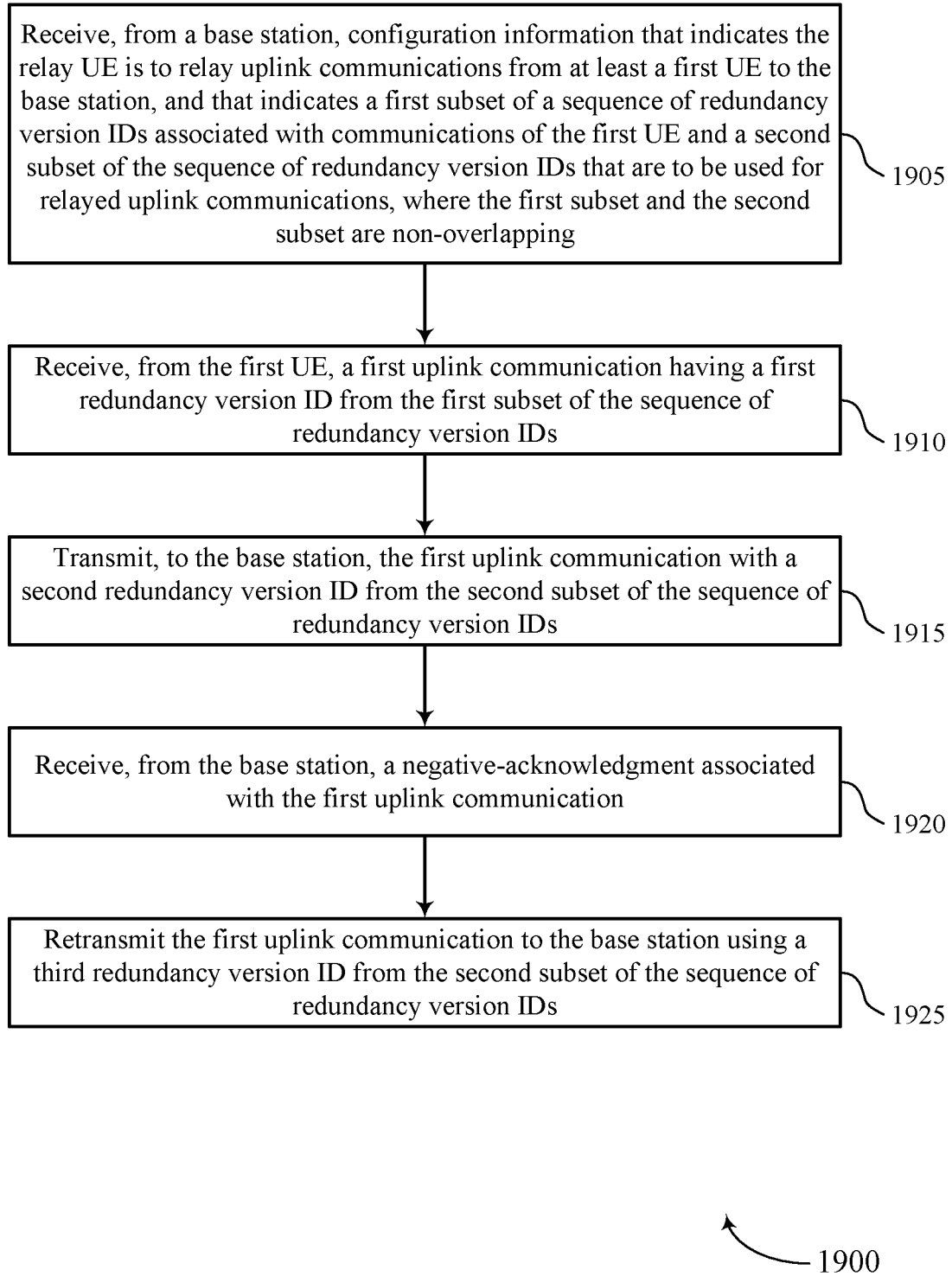

FIG. 19 shows a flowchart illustrating a method 1900 that supports per-link redundancy version assignment for uplink relays in accordance with aspects of the present disclosure. The operations of method 1900 may be implemented by a UE 115 or its components as described herein. For example, the operations of method 1900 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1905, the UE may receive, from a base station, configuration information that indicates the relay UE is to relay uplink communications from at least a first UE to the base station, and that indicates a first subset of a sequence of RV IDs associated with communications of the first UE and a second subset of the sequence of RV IDs that are to be used for relayed uplink communications, where the first subset and the second subset are non-overlapping. The operations of 1905 may be performed according to the methods described herein. In some examples, aspects of the operations of 1905 may be performed by a relay manager as described with reference to FIGS. 8 through 11.

At 1910, the UE may receive, from the first UE, a first uplink communication having a first RV ID from the first subset of the sequence of RV IDs. The operations of 1910 may be performed according to the methods described herein. In some examples, aspects of the operations of 1910 may be performed by an uplink communication manager as described with reference to FIGS. 8 through 11.

At 1915, the UE may transmit, to the base station, the first uplink communication with a second RV ID from the second subset of the sequence of RV IDs. The operations of 1915 may be performed according to the methods described herein. In some examples, aspects of the operations of 1915 may be performed by a retransmission manager as described with reference to FIGS. 8 through 11.

At 1920, the UE may receive, from the base station, a NACK associated with the first uplink communication. The operations of 1920 may be performed according to the methods described herein. In some examples, aspects of the operations of 1920 may be performed by a retransmission manager as described with reference to FIGS. 8 through 11.

At 1925, the UE may retransmit the first uplink communication to the base station using a third RV ID from the second subset of the sequence of RV IDs. The operations of 1925 may be performed according to the methods described herein. In some examples, aspects of the operations of 1925 may be performed by a retransmission manager as described with reference to FIGS. 8 through 11.

Figure 20:
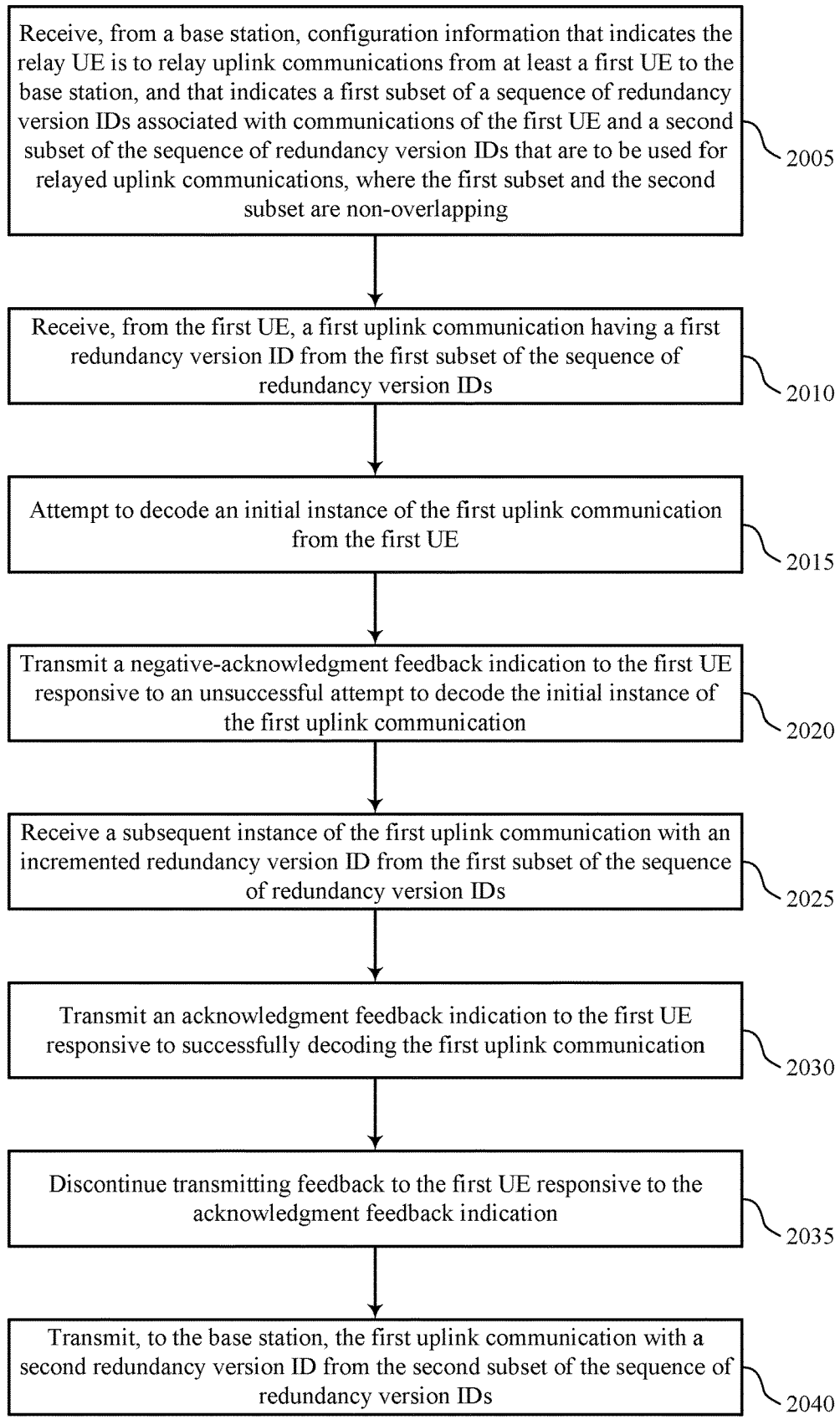

FIG. 20 shows a flowchart illustrating a method 2000 that supports per-link redundancy version assignment for uplink relays in accordance with aspects of the present disclosure. The operations of method 2000 may be implemented by a UE 115 or its components as described herein. For example, the operations of method 2000 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 2005, the UE may receive, from a base station, configuration information that indicates the relay UE is to relay uplink communications from at least a first UE to the base station, and that indicates a first subset of a sequence of RV IDs associated with communications of the first UE and a second subset of the sequence of RV IDs that are to be used for relayed uplink communications, where the first subset and the second subset are non-overlapping. The operations of 2005 may be performed according to the methods described herein. In some examples, aspects of the operations of 2005 may be performed by a relay manager as described with reference to FIGS. 8 through 11.

At 2010, the UE may receive, from the first UE, a first uplink communication having a first RV ID from the first subset of the sequence of RV IDs. The operations of 2010 may be performed according to the methods described herein. In some examples, aspects of the operations of 2010 may be performed by an uplink communication manager as described with reference to FIGS. 8 through 11.

At 2015, the UE may attempt to decode an initial instance of the first uplink communication from the first UE. The operations of 2015 may be performed according to the methods described herein. In some examples, aspects of the operations of 2015 may be performed by an uplink communication manager as described with reference to FIGS. 8 through 11.

At 2020, the UE may transmit a NACK feedback indication to the first UE responsive to an unsuccessful attempt to decode the initial instance of the first uplink communication. The operations of 2020 may be performed according to the methods described herein. In some examples, aspects of the operations of 2020 may be performed by a feedback manager as described with reference to FIGS. 8 through 11.

At 2025, the UE may receive a subsequent instance of the first uplink communication with an incremented RV ID from the first subset of the sequence of RV IDs. The operations of 2025 may be performed according to the methods described herein. In some examples, aspects of the operations of 2025 may be performed by an uplink communication manager as described with reference to FIGS. 8 through 11.

At 2030, the UE may transmit an acknowledgment feedback indication to the first UE responsive to successfully decoding the first uplink communication. The operations of 2030 may be performed according to the methods described herein. In some examples, aspects of the operations of 2030 may be performed by a feedback manager as described with reference to FIGS. 8 through 11.

At 2035, the UE may discontinue transmitting feedback to the first UE responsive to the acknowledgment feedback indication. The operations of 2035 may be performed according to the methods described herein. In some examples, aspects of the operations of 2035 may be performed by a feedback manager as described with reference to FIGS. 8 through 11.

At 2040, the UE may transmit, to the base station, the first uplink communication with a second RV ID from the second subset of the sequence of RV IDs. The operations of 2040 may be performed according to the methods described herein. In some examples, aspects of the operations of 2040 may be performed by a retransmission manager as described with reference to FIGS. 8 through 11.

Figure 21:
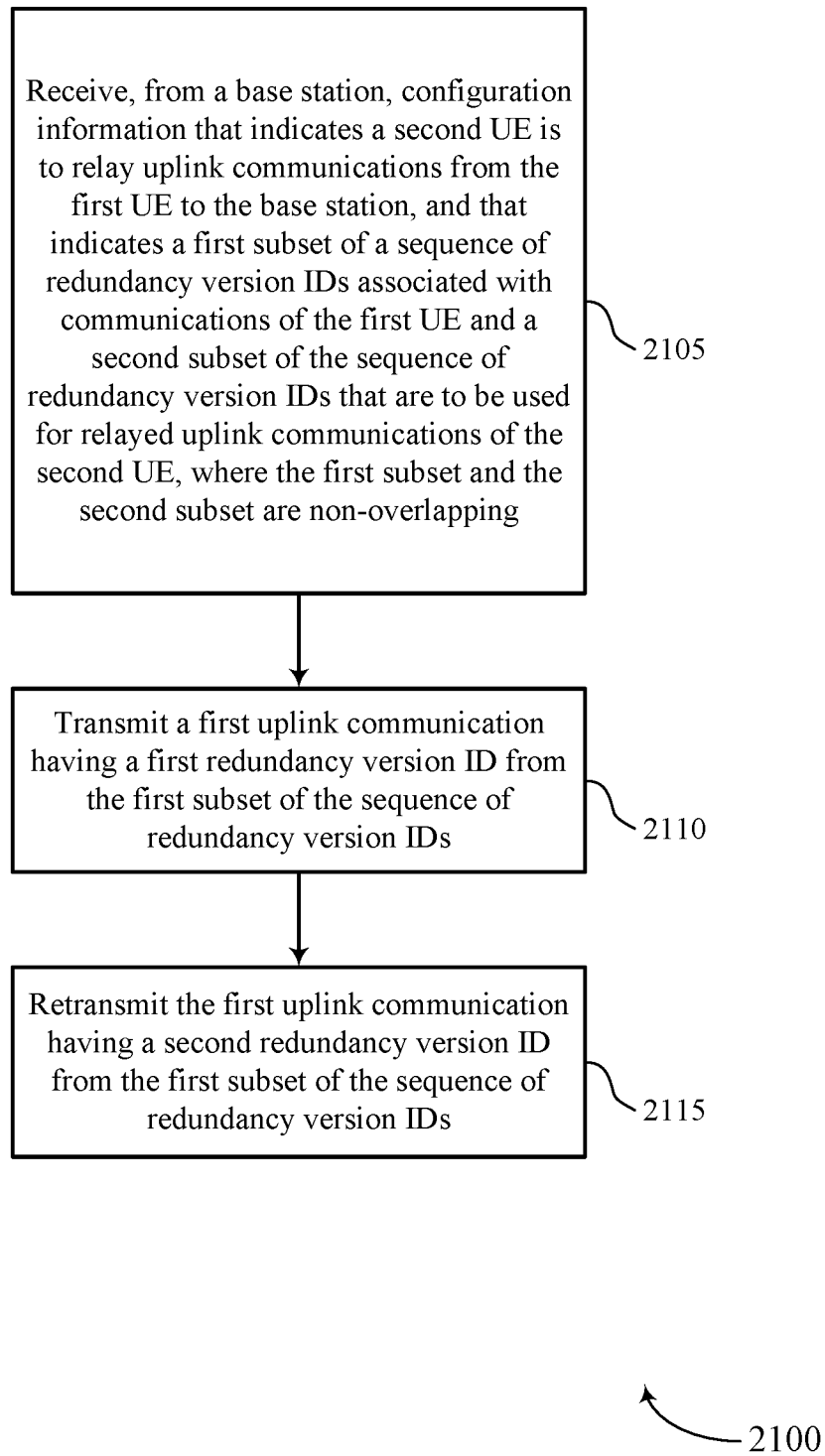

FIG. 21 shows a flowchart illustrating a method 2100 that supports per-link redundancy version assignment for uplink relays in accordance with aspects of the present disclosure. The operations of method 2100 may be implemented by a UE 115 or its components as described herein. For example, the operations of method 2100 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 2105, the UE may receive, from a base station, configuration information that indicates a second UE is to relay uplink communications from the first UE to the base station, and that indicates a first subset of a sequence of RV IDs associated with communications of the first UE and a second subset of the sequence of RV IDs that are to be used for relayed uplink communications of the second UE, where the first subset and the second subset are non-overlapping. The operations of 2105 may be performed according to the methods described herein. In some examples, aspects of the operations of 2105 may be performed by a relay manager as described with reference to FIGS. 8 through 11.

At 2110, the UE may transmit a first uplink communication having a first RV ID from the first subset of the sequence of RV IDs. The operations of 2110 may be performed according to the methods described herein. In some examples, aspects of the operations of 2110 may be performed by an uplink communication manager as described with reference to FIGS. 8 through 11.

At 2115, the UE may retransmit the first uplink communication having a second RV ID from the first subset of the sequence of RV IDs. The operations of 2115 may be performed according to the methods described herein. In some examples, aspects of the operations of 2115 may be performed by a retransmission manager as described with reference to FIGS. 8 through 11.

Figure 22:
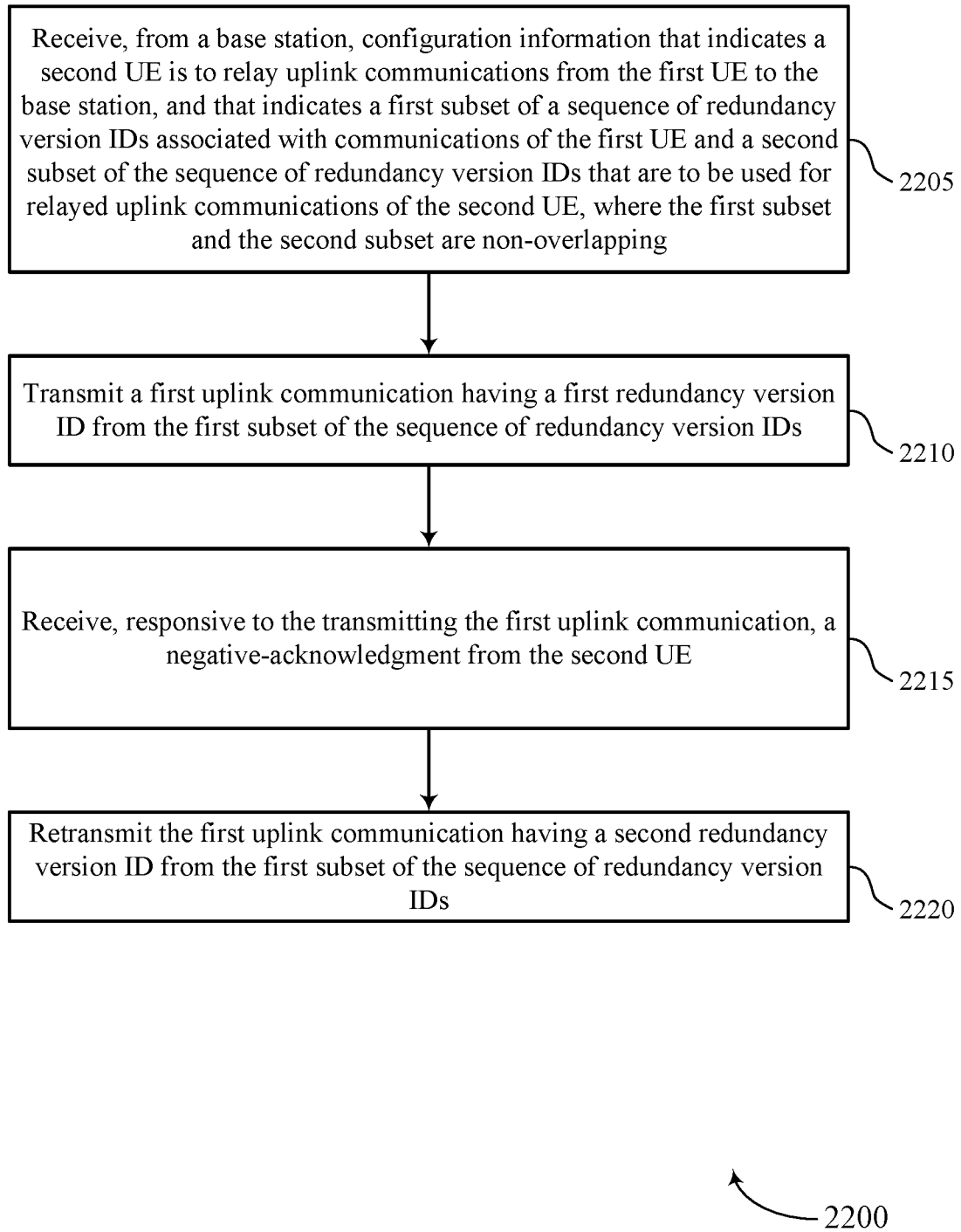

FIG. 22 shows a flowchart illustrating a method 2200 that supports per-link redundancy version assignment for uplink relays in accordance with aspects of the present disclosure. The operations of method 2200 may be implemented by a UE 115 or its components as described herein. For example, the operations of method 2200 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 2205, the UE may receive, from a base station, configuration information that indicates a second UE is to relay uplink communications from the first UE to the base station, and that indicates a first subset of a sequence of RV IDs associated with communications of the first UE and a second subset of the sequence of RV IDs that are to be used for relayed uplink communications of the second UE, where the first subset and the second subset are non-overlapping. The operations of 2205 may be performed according to the methods described herein. In some examples, aspects of the operations of 2205 may be performed by a relay manager as described with reference to FIGS. 8 through 11.

At 2210, the UE may transmit a first uplink communication having a first RV ID from the first subset of the sequence of RV IDs. The operations of 2210 may be performed according to the methods described herein. In some examples, aspects of the operations of 2210 may be performed by an uplink communication manager as described with reference to FIGS. 8 through 11.

At 2215, the UE may receive, responsive to the transmitting the first uplink communication, a NACK from the second UE. The operations of 2215 may be performed according to the methods described herein. In some examples, aspects of the operations of 2215 may be performed by a feedback manager as described with reference to FIGS. 8 through 11.

At 2220, the UE may retransmit the first uplink communication having a second RV ID from the first subset of the sequence of RV IDs. The operations of 2220 may be performed according to the methods described herein. In some examples, aspects of the operations of 2220 may be performed by a retransmission manager as described with reference to FIGS. 8 through 11.

Figure 23:
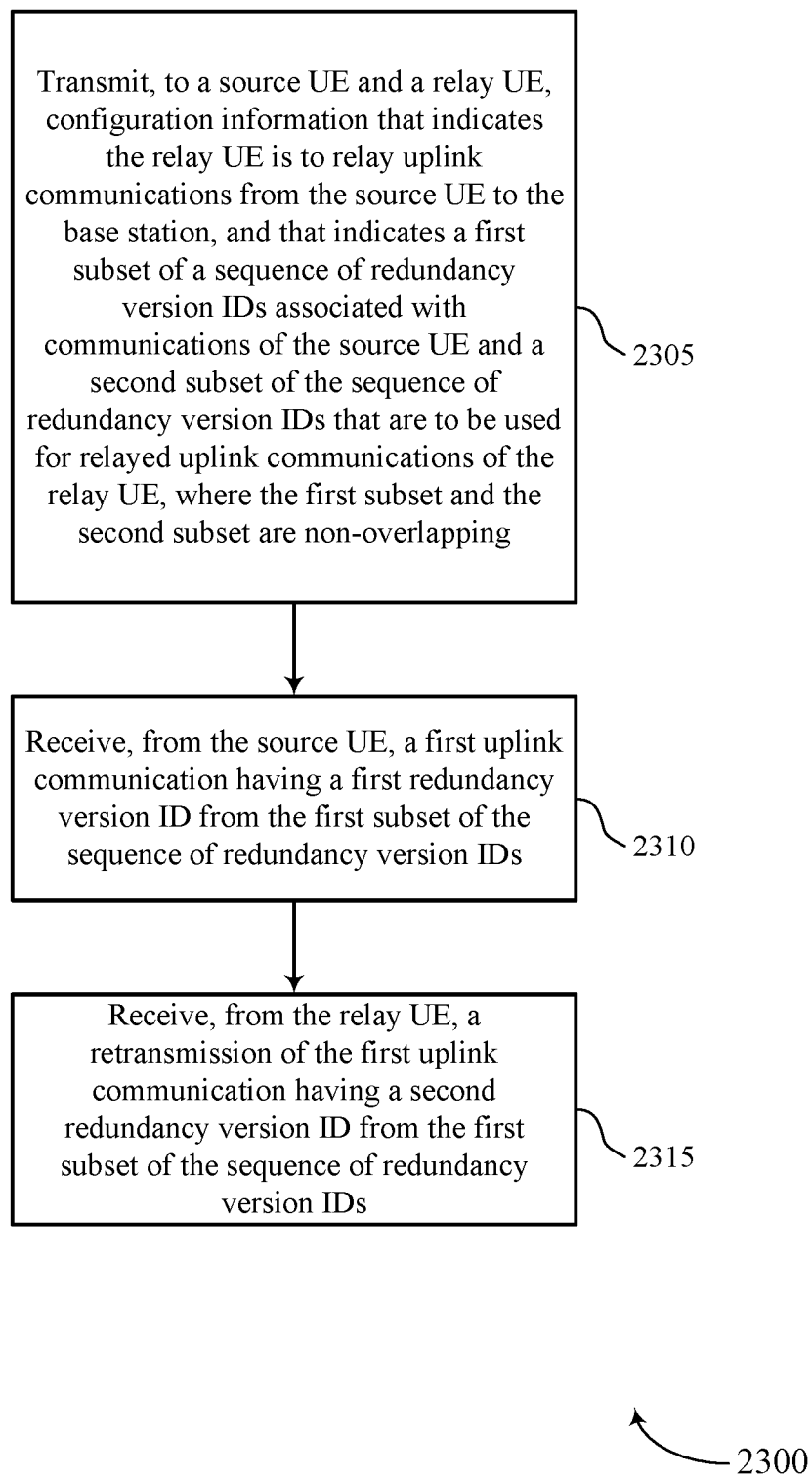

FIG. 23 shows a flowchart illustrating a method 2300 that supports per-link redundancy version assignment for uplink relays in accordance with aspects of the present disclosure. The operations of method 2300 may be implemented by a base station 105 or its components as described herein. For example, the operations of method 2300 may be performed by a communications manager as described with reference to FIGS. 12 through 15. In some examples, a base station may execute a set of instructions to control the functional elements of the base station to perform the functions described below. Additionally or alternatively, a base station may perform aspects of the functions described below using special-purpose hardware.

At 2305, the base station may transmit, to a source UE and a relay UE, configuration information that indicates the relay UE is to relay uplink communications from the source UE to the base station, and that indicates a first subset of a sequence of RV IDs associated with communications of the source UE and a second subset of the sequence of RV IDs that are to be used for relayed uplink communications of the relay UE, where the first subset and the second subset are non-overlapping. The operations of 2305 may be performed according to the methods described herein. In some examples, aspects of the operations of 2305 may be performed by a relay manager as described with reference to FIGS. 12 through 15.

At 2310, the base station may receive, from the source UE, a first uplink communication having a first RV ID from the first subset of the sequence of RV IDs. The operations of 2310 may be performed according to the methods described herein. In some examples, aspects of the operations of 2310 may be performed by an uplink communication manager as described with reference to FIGS. 12 through 15.

At 2315, the base station may receive, from the relay UE, a retransmission of the first uplink communication having a second RV ID from the first subset of the sequence of RV IDs. The operations of 2315 may be performed according to the methods described herein. In some examples, aspects of the operations of 2315 may be performed by an uplink communication manager as described with reference to FIGS. 12 through 15.

Figure 24:
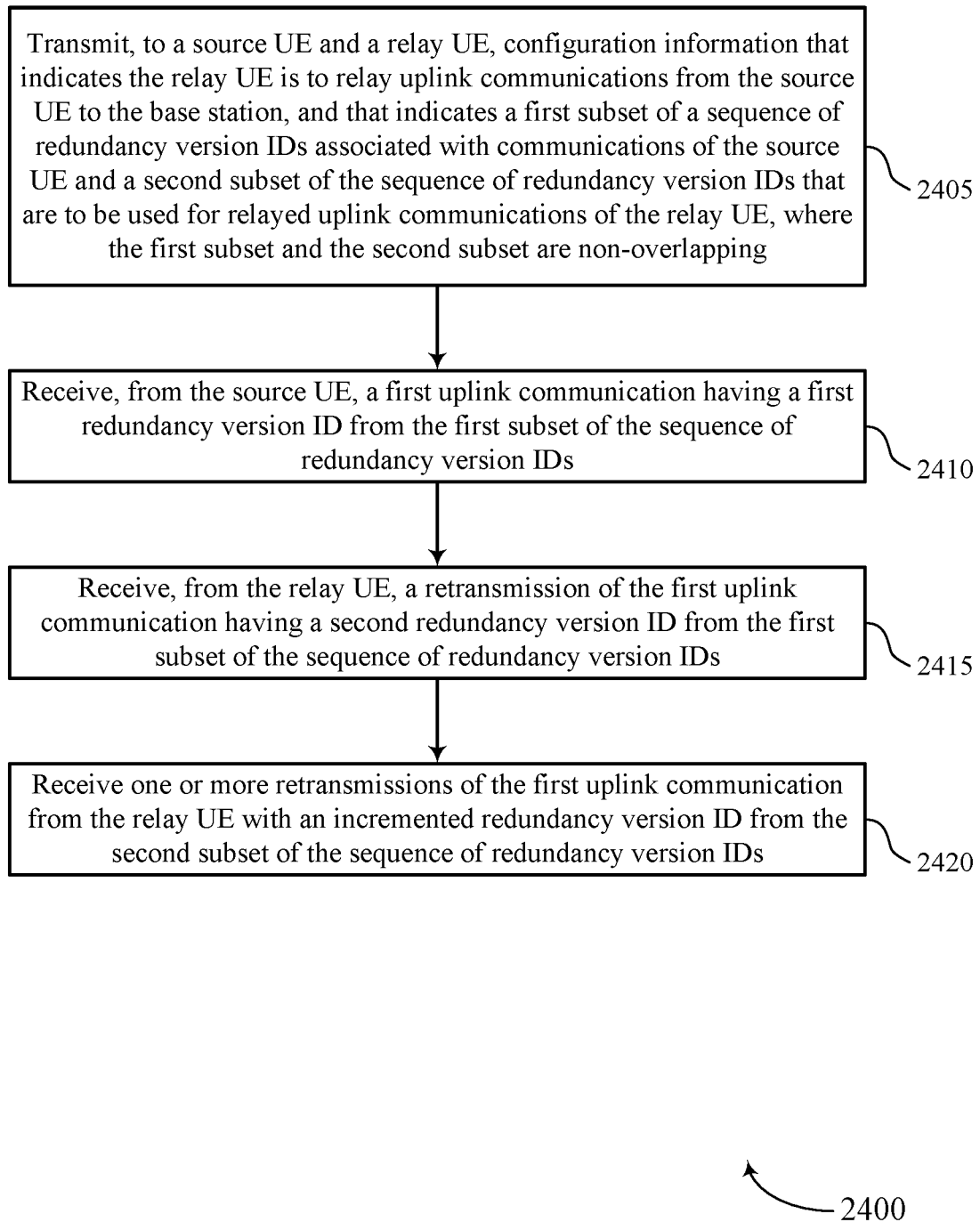

FIG. 24 shows a flowchart illustrating a method 2400 that supports per-link redundancy version assignment for uplink relays in accordance with aspects of the present disclosure. The operations of method 2400 may be implemented by a base station 105 or its components as described herein. For example, the operations of method 2400 may be performed by a communications manager as described with reference to FIGS. 12 through 15. In some examples, a base station may execute a set of instructions to control the functional elements of the base station to perform the functions described below. Additionally or alternatively, a base station may perform aspects of the functions described below using special-purpose hardware.

At 2405, the base station may transmit, to a source UE and a relay UE, configuration information that indicates the relay UE is to relay uplink communications from the source UE to the base station, and that indicates a first subset of a sequence of RV IDs associated with communications of the source UE and a second subset of the sequence of RV IDs that are to be used for relayed uplink communications of the relay UE, where the first subset and the second subset are non-overlapping. The operations of 2405 may be performed according to the methods described herein. In some examples, aspects of the operations of 2405 may be performed by a relay manager as described with reference to FIGS. 12 through 15.

At 2410, the base station may receive, from the source UE, a first uplink communication having a first RV ID from the first subset of the sequence of RV IDs. The operations of 2410 may be performed according to the methods described herein. In some examples, aspects of the operations of 2410 may be performed by an uplink communication manager as described with reference to FIGS. 12 through 15.

At 2415, the base station may receive, from the relay UE, a retransmission of the first uplink communication having a second RV ID from the first subset of the sequence of RV IDs. The operations of 2415 may be performed according to the methods described herein. In some examples, aspects of the operations of 2415 may be performed by an uplink communication manager as described with reference to FIGS. 12 through 15.

At 2420, the base station may receive one or more retransmissions of the first uplink communication from the relay UE with an incremented RV ID from the second subset of the sequence of RV IDs. The operations of 2420 may be performed according to the methods described herein. In some examples, aspects of the operations of 2420 may be performed by a retransmission manager as described with reference to FIGS. 12 through 15.

The following provides an overview of aspects of the present disclosure:

Aspect 1: A method for wireless communication at a relay UE, comprising: receiving, from a base station, configuration information that indicates the relay UE is to relay uplink communications from at least a first UE to the base station, and that indicates a first subset of a sequence of redundancy version IDs associated with communications of the first UE and a second subset of the sequence of redundancy version IDs that are to be used for relayed uplink communications, wherein the first subset and the second subset are non-overlapping; receiving, from the first UE, a first uplink communication having a first redundancy version ID from the first subset of the sequence of redundancy version IDs; and transmitting, to the base station, the first uplink communication with a second redundancy version ID from the second subset of the sequence of redundancy version IDs.

Aspect 2: The method of aspect 1, further comprising: transmitting, to the first UE, a feedback indication that acknowledges successful receipt of the first uplink communication, and wherein the transmitting the first uplink communication with the second redundancy version ID is performed responsive to the transmitting the feedback indication.

Aspect 3: The method of any of aspects 1 through 2, wherein the first subset of the sequence of redundancy version IDs are self-decodable at a receiving device.

Aspect 4: The method of any of aspects 1 through 3, wherein the configuration information is received from the base station in RRC signaling, in a medium access control (MAC) control element, or any combinations thereof.

Aspect 5: The method of any of aspects 1 through 4, further comprising: receiving a retransmission of the first uplink communication from the first UE, and wherein the retransmission uses a third redundancy version ID from the first subset of the sequence of redundancy version IDs responsive to a negative-acknowledgment from the second UE, and wherein the retransmission uses the third redundancy version ID from either of the first subset or the second subset of the sequence of redundancy version IDs responsive to an acknowledgment from the second UE.

Aspect 6: The method of any of aspects 1 through 5, further comprising: receiving, from the base station, a negative-acknowledgment associated with the first uplink communication; and retransmitting the first uplink communication to the base station using a third redundancy version ID from the second subset of the sequence of redundancy version IDs.

Aspect 7: The method of any of aspects 1 through 6, further comprising: attempting to decode an initial instance of the first uplink communication from the first UE; transmitting a negative-acknowledgment feedback indication to the first UE responsive to an unsuccessful attempt to decode the initial instance of the first uplink communication; and receiving a subsequent instance of the first uplink communication with an incremented redundancy version ID from the first subset of the sequence of redundancy version IDs.

Aspect 8: The method of aspect 7, further comprising: transmitting an acknowledgment feedback indication to the first UE responsive to successfully decoding the first uplink communication; and discontinuing transmitting feedback to the first UE responsive to the acknowledgment feedback indication.

Aspect 9: The method of any of aspects 1 through 8, wherein the configuration information includes a first number of instances that the first uplink communication is to be retransmitted prior to a feedback indication from the base station, and includes a second number of instances that the first uplink communication is to be retransmitted subsequent to a negative-acknowledgment feedback indication from the base station.

Aspect 10: The method of aspect 9, wherein the first number of instances and the second number of instances are a same or different number of instances, and the first UE, the second UE, or both are configured to use any redundancy version ID of the sequence of redundancy version IDs subsequent to the negative-acknowledgment feedback indication from the base station.

Aspect 11: A method for wireless communication at a first UE, comprising: receiving, from a base station, configuration information that indicates a second UE is to relay uplink communications from the first UE to the base station, and that indicates a first subset of a sequence of redundancy version IDs associated with communications of the first UE and a second subset of the sequence of redundancy version IDs that are to be used for relayed uplink communications of the second UE, wherein the first subset and the second subset are non-overlapping; transmitting a first uplink communication having a first redundancy version ID from the first subset of the sequence of redundancy version IDs; and retransmitting the first uplink communication having a second redundancy version ID from the first subset of the sequence of redundancy version IDs.

Aspect 12: The method of aspect 11, wherein the first subset of the sequence of redundancy version IDs are self-decodable at a receiving device.

Aspect 13: The method of any of aspects 11 through 12, wherein the configuration information is received from the base station in RRC signaling, in a medium access control (MAC) control element, or any combinations thereof.

Aspect 14: The method of any of aspects 11 through 13, wherein the second redundancy version ID is used for the retransmitting responsive to a negative-acknowledgment associated with the first uplink communication from the second UE, and one or more retransmissions of the first uplink communication uses a third redundancy version ID from either of the first subset or the second subset of the sequence of redundancy version IDs responsive to an acknowledgment associated with the first uplink communication from the second UE.

Aspect 15: The method of any of aspects 11 through 14, further comprising: receiving, responsive to the transmitting the first uplink communication, a negative-acknowledgment from the second UE, and wherein the retransmitting is performed responsive to the negative-acknowledgment and uses an incremented redundancy version ID from the first subset of the sequence of redundancy version IDs.

Aspect 16: The method of any of aspects 11 through 15, wherein the second UE discontinues transmitting feedback information for retransmitted instances of the first uplink communication responsive to a feedback indication that indicates successful decoding of the first uplink communication.

Aspect 17: The method of any of aspects 11 through 16, wherein the configuration information includes a first number of instances that the first uplink communication is to be retransmitted prior to a feedback indication from the base station, and includes a second number of instances that the first uplink communication is to be retransmitted subsequent to a negative-acknowledgment feedback indication from the base station.

Aspect 18: The method of aspect 17, wherein the first number of instances and the second number of instances are a same or different number of instances, and the first UE, the second UE, or both are configured to use any redundancy version ID of the sequence of redundancy version IDs subsequent to the negative-acknowledgment feedback indication from the base station.

Aspect 19: A method for wireless communication at a base station, comprising: transmitting, to a source UE and a relay UE, configuration information that indicates the relay UE is to relay uplink communications from the source UE to the base station, and that indicates a first subset of a sequence of redundancy version IDs associated with communications of the source UE and a second subset of the sequence of redundancy version IDs that are to be used for relayed uplink communications of the relay UE, wherein the first subset and the second subset are non-overlapping; receiving, from the source UE, a first uplink communication having a first redundancy version ID from the first subset of the sequence of redundancy version IDs; and receiving, from the relay UE, a retransmission of the first uplink communication having a second redundancy version ID from the first subset of the sequence of redundancy version IDs.

Aspect 20: The method of aspect 19, wherein the first subset of the sequence of redundancy version IDs are self-decodable at a receiving device.

Aspect 21: The method of any of aspects 19 through 20, wherein the configuration information is transmitted in RRC signaling, in a medium access control (MAC) control element, or any combinations thereof.

Aspect 22: The method of any of aspects 19 through 21, wherein receiving a retransmission of the first uplink communication from the source UE, and wherein the retransmission uses a third redundancy version ID from the first subset of the sequence of redundancy version IDs responsive to a negative-acknowledgment from the relay UE, and wherein the retransmission uses the third redundancy version ID from either of the first subset or the second subset of the sequence of redundancy version IDs responsive to an acknowledgment from the relay UE.

Aspect 23: The method of any of aspects 19 through 22, further comprising: receiving one or more retransmissions of the first uplink communication from the relay UE with an incremented redundancy version ID from the second subset of the sequence of redundancy version IDs.

Aspect 24: The method of any of aspects 19 through 23, wherein the configuration information includes a first number of instances that the first uplink communication is to be retransmitted prior to a feedback indication from the base station, and includes a second number of instances that the first uplink communication is to be retransmitted subsequent to a negative-acknowledgment feedback indication from the base station.

Aspect 25: The method of aspect 24, wherein the first number of instances and the second number of instances are a same or different number of instances, and the source UE, the relay UE, or both are configured to use any redundancy version ID of the sequence of redundancy version IDs subsequent to the negative-acknowledgment feedback indication from the base station.

Aspect 26: An apparatus for wireless communication at a relay UE, comprising a processor; memory coupled with the processor; and instructions stored in the memory and executable by the processor to cause the apparatus to perform a method of any of aspects 1 through 10.

Aspect 27: An apparatus for wireless communication at a relay UE, comprising at least one means for performing a method of any of aspects 1 through 10.

Aspect 28: A non-transitory computer-readable medium storing code for wireless communication at a relay UE, the code comprising instructions executable by a processor to perform a method of any of aspects 1 through 10.

Aspect 29: An apparatus for wireless communication at a first UE, comprising a processor; memory coupled with the processor; and instructions stored in the memory and executable by the processor to cause the apparatus to perform a method of any of aspects 11 through 18.

Aspect 30: An apparatus for wireless communication at a first UE, comprising at least one means for performing a method of any of aspects 11 through 18.

Aspect 31: A non-transitory computer-readable medium storing code for wireless communication at a first UE, the code comprising instructions executable by a processor to perform a method of any of aspects 11 through 18.

Aspect 32: An apparatus for wireless communication at a base station, comprising a processor; memory coupled with the processor; and instructions stored in the memory and executable by the processor to cause the apparatus to perform a method of any of aspects 19 through 25.

Aspect 33: An apparatus for wireless communication at a base station, comprising at least one means for performing a method of any of aspects 19 through 25.

Aspect 34: A non-transitory computer-readable medium storing code for wireless communication at a base station, the code comprising instructions executable by a processor to perform a method of any of aspects 19 through 25.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a relay user equipment (UE), comprising:
   receiving, from a base station, configuration information that indicates the relay UE is to relay uplink communications from at least a first UE to the base station, and that indicates a first subset of a sequence of redundancy version IDs associated with communications of the first UE and a second subset of the sequence of redundancy version IDs that are to be used for relayed uplink communications that are configured to be relayed through the relay UE to the base station and configured to be combined with the communications of the first UE at the base station, wherein the first subset and the second subset are non-overlapping;
   receiving, from the first UE, a first uplink communication transmitted to both the relay UE and the base station, the first uplink communication having a first redundancy version ID from the first subset of the sequence of redundancy version IDs; and
   transmitting, to the base station, the first uplink communication with a second redundancy version ID from the second subset of the sequence of redundancy version IDs.

2. The method of claim 1, further comprising:
   transmitting, to the first UE, a feedback indication that acknowledges successful receipt of the first uplink communication, and wherein the transmitting the first uplink communication with the second redundancy version ID is performed responsive to the transmitting the feedback indication.

3. The method of claim 1, wherein the first subset of the sequence of redundancy version IDs are self-decodable at a receiving device.

4. The method of claim 1, wherein the configuration information is received from the base station in radio resource control (RRC) signaling, in a medium access control (MAC) control element, or any combinations thereof.

5. The method of claim 1, further comprising:
   receiving a retransmission of the first uplink communication from the first UE, and wherein the retransmission uses a third redundancy version ID from the first subset of the sequence of redundancy version IDs responsive to a negative-acknowledgment from a second UE, and wherein the retransmission uses the third redundancy version ID from either of the first subset or the second subset of the sequence of redundancy version IDs responsive to an acknowledgment from the second UE.

6. The method of claim 1, further comprising:
   receiving, from the base station, a negative-acknowledgment associated with the first uplink communication; and
   retransmitting the first uplink communication to the base station using a third redundancy version ID from the second subset of the sequence of redundancy version IDs.

7. The method of claim 1, further comprising:
   attempting to decode an initial instance of the first uplink communication from the first UE;
   transmitting a negative-acknowledgment feedback indication to the first UE responsive to an unsuccessful attempt to decode the initial instance of the first uplink communication;
   receiving a subsequent instance of the first uplink communication with an incremented redundancy version ID from the first subset of the sequence of redundancy version IDs;
   transmitting an acknowledgment feedback indication to the first UE responsive to successfully decoding the first uplink communication; and
   discontinuing transmitting feedback to the first UE responsive to the acknowledgment feedback indication.

8. The method of claim 1, wherein:
   the configuration information includes a first number of instances that the first uplink communication is to be retransmitted prior to a feedback indication from the base station, and includes a second number of instances that the first uplink communication is to be retransmitted subsequent to a negative-acknowledgment feedback indication from the base station; and
   the first number of instances and the second number of instances are a same or different number of instances, and wherein the first UE, a second UE, or both are configured to use any redundancy version ID of the sequence of redundancy version IDs subsequent to the negative-acknowledgment feedback indication from the base station.

9. A method for wireless communication at a first user equipment (UE), comprising:
   receiving, from a base station, configuration information that indicates a second UE is to relay uplink communications from the first UE to the base station, and that indicates a first subset of a sequence of redundancy version IDs associated with communications of the first UE and a second subset of the sequence of redundancy version IDs that are to be used for relayed uplink communications of the second UE that are configured to be combined with the communications of the first UE at the base station, wherein the first subset and the second subset are non-overlapping;

transmitting, to both the relay UE and the base station, a first uplink communication having a first redundancy version ID from the first subset of the sequence of redundancy version IDs; and retransmitting the first uplink communication having a second redundancy version ID from the first subset of the sequence of redundancy version IDs.

10. The method of claim 9, wherein the first subset of the sequence of redundancy version IDs are self-decodable at a receiving device.

11. The method of claim 9, wherein the configuration information is received from the base station in radio resource control (RRC) signaling, in a medium access control (MAC) control element, or any combinations thereof.

12. The method of claim 9, wherein the second redundancy version ID is used for the retransmitting responsive to a negative-acknowledgment associated with the first uplink communication from the second UE, and wherein one or more retransmissions of the first uplink communication uses a third redundancy version ID from either of the first subset or the second subset of the sequence of redundancy version IDs responsive to an acknowledgment associated with the first uplink communication from the second UE.

13. The method of claim 9, further comprising:
receiving, responsive to the transmitting the first uplink communication, a negative-acknowledgment from the second UE, and wherein the retransmitting is performed responsive to the negative-acknowledgment and uses an incremented redundancy version ID from the first subset of the sequence of redundancy version IDs.

14. The method of claim 9, wherein the second UE discontinues transmitting feedback information for retransmitted instances of the first uplink communication responsive to a feedback indication that indicates successful decoding of the first uplink communication.

15. The method of claim 9, wherein:
the configuration information includes a first number of instances that the first uplink communication is to be retransmitted prior to a feedback indication from the base station, and includes a second number of instances that the first uplink communication is to be retransmitted subsequent to a negative-acknowledgment feedback indication from the base station; and
the first number of instances and the second number of instances are a same or different number of instances, and wherein the first UE, the second UE, or both are configured to use any redundancy version ID of the sequence of redundancy version IDs subsequent to the negative-acknowledgment feedback indication from the base station.

16. An apparatus for wireless communication at a relay user equipment (UE), comprising:
a processor,
memory coupled with the processor; and
instructions stored in the memory and executable by the processor to cause the apparatus to:
receive, from a base station, configuration information that indicates the relay UE is to relay uplink communications from at least a first UE to the base station, and that indicates a first subset of a sequence of redundancy version IDs associated with communications of the first UE and a second subset of the sequence of redundancy version IDs that are to be used for relayed uplink communications that are configured to be relayed through the relay UE to the base station and configured to be combined with the communications of the first UE at the base station, wherein the first subset and the second subset are non-overlapping;
receive, from the first UE, a first uplink communication transmitted to both the relay UE and the base station, the first uplink communication having a first redundancy version ID from the first subset of the sequence of redundancy version IDs; and
transmit, to the base station, the first uplink communication with a second redundancy version ID from the second subset of the sequence of redundancy version IDs.

17. The apparatus of claim 16, wherein the instructions are further executable by the processor to cause the apparatus to:
transmit, to the first UE, a feedback indication that acknowledges successful receipt of the first uplink communication, and wherein the transmitting the first uplink communication with the second redundancy version ID is performed responsive to the transmitting the feedback indication.

18. The apparatus of claim 16, wherein the first subset of the sequence of redundancy version IDs are self-decodable at a receiving device.

19. The apparatus of claim 16, wherein the configuration information is received from the base station in radio resource control (RRC) signaling, in a medium access control (MAC) control element, or any combinations thereof.

20. The apparatus of claim 16, wherein the instructions are further executable by the processor to cause the apparatus to:
receive a retransmission of the first uplink communication from the first UE, and wherein the retransmission uses a third redundancy version ID from the first subset of the sequence of redundancy version IDs responsive to a negative-acknowledgment from a second UE, and wherein the retransmission uses the third redundancy version ID from either of the first subset or the second subset of the sequence of redundancy version IDs responsive to an acknowledgment from the second UE.

21. The apparatus of claim 16, wherein the instructions are further executable by the processor to cause the apparatus to:
receive, from the base station, a negative-acknowledgment associated with the first uplink communication; and
retransmit the first uplink communication to the base station using a third redundancy version ID from the second subset of the sequence of redundancy version IDs.

22. The apparatus of claim 16, wherein the instructions are further executable by the processor to cause the apparatus to:
attempt to decode an initial instance of the first uplink communication from the first UE;
transmit a negative-acknowledgment feedback indication to the first UE responsive to an unsuccessful attempt to decode the initial instance of the first uplink communication;
receive a subsequent instance of the first uplink communication with an incremented redundancy version ID from the first subset of the sequence of redundancy version IDs;
transmit an acknowledgment feedback indication to the first UE responsive to successfully decoding the first uplink communication; and discontinue transmitting feedback to the first UE responsive to the acknowledgment feedback indication.

23. The apparatus of claim 16, wherein:
the configuration information includes a first number of instances that the first uplink communication is to be retransmitted prior to a feedback indication from the base station, and includes a second number of instances that the first uplink communication is to be retransmitted subsequent to a negative-acknowledgment feedback indication from the base station; and
the first number of instances and the second number of instances are a same or different number of instances, and wherein the first UE, a second UE, or both are configured to use any redundancy version ID of the sequence of redundancy version IDs subsequent to the negative-acknowledgment feedback indication from the base station.

24. An apparatus for wireless communication at a first user equipment (UE), comprising:
a processor, memory coupled with the processor; and
instructions stored in the memory and executable by the processor to cause the apparatus to:
receive, from a base station, configuration information that indicates a second UE is to relay uplink communications from the first UE to the base station, and that indicates a first subset of a sequence of redundancy version IDs associated with communications of the first UE and a second subset of the sequence of redundancy version IDs that are to be used for relayed uplink communications of the second UE that are configured to be combined with the communications of the first UE at the base station, wherein the first subset and the second subset are non-overlapping;
transmit, to both the relay UE and the base station, a first uplink communication having a first redundancy version ID from the first subset of the sequence of redundancy version IDs; and
retransmit the first uplink communication having a second redundancy version ID from the first subset of the sequence of redundancy version IDs.

25. The apparatus of claim 24, wherein the first subset of the sequence of redundancy version IDs are self-decodable at a receiving device.

26. The apparatus of claim 24, wherein the configuration information is received from the base station in radio resource control (RRC) signaling, in a medium access control (MAC) control element, or any combinations thereof.

27. The apparatus of claim 24, wherein the second redundancy version ID is used for the retransmitting responsive to a negative-acknowledgment associated with the first uplink communication from the second UE, and wherein one or more retransmissions of the first uplink communication uses a third redundancy version ID from either of the first subset or the second subset of the sequence of redundancy version IDs responsive to an acknowledgment associated with the first uplink communication from the second UE.

28. The apparatus of claim 24, wherein the instructions are further executable by the processor to cause the apparatus to:
receive, responsive to the transmitting the first uplink communication, a negative-acknowledgment from the second UE, and wherein the retransmitting is performed responsive to the negative-acknowledgment and uses an incremented redundancy version ID from the first subset of the sequence of redundancy version IDs.

29. The apparatus of claim 24, wherein the second UE discontinues transmitting feedback information for retransmitted instances of the first uplink communication responsive to a feedback indication that indicates successful decoding of the first uplink communication.

30. The apparatus of claim 24, wherein:
the configuration information includes a first number of instances that the first uplink communication is to be retransmitted prior to a feedback indication from the base station, and includes a second number of instances that the first uplink communication is to be retransmitted subsequent to a negative-acknowledgment feedback indication from the base station; and
the first number of instances and the second number of instances are a same or different number of instances, and wherein the first UE, the second UE, or both are configured to use any redundancy version ID of the sequence of redundancy version IDs subsequent to the negative-acknowledgment feedback indication from the base station.

* * * * *